(12) United States Patent
Park

(10) Patent No.: US 11,330,044 B2
(45) Date of Patent: *May 10, 2022

(54) METHOD AND SYSTEM FOR PROCESSING LOAD BALANCING USING VIRTUAL SWITCH IN VIRTUAL NETWORK ENVIRONMENT

(71) Applicant: NHN Entertainment Corporation, Seongnam-si (KR)

(72) Inventor: Seong Woo Park, Seongnam-si (KR)

(73) Assignee: NHN Entertainment Corporation, Seongnam-si (KR)

(*) Notice: Subject to any disclaimer, the term of this patent is extended or adjusted under 35 U.S.C. 154(b) by 4 days.

This patent is subject to a terminal disclaimer.

(21) Appl. No.: 16/791,346

(22) Filed: Feb. 14, 2020

(65) Prior Publication Data
US 2020/0186598 A1 Jun. 11, 2020

Related U.S. Application Data

(63) Continuation of application No. 15/685,418, filed on Aug. 24, 2017, now Pat. No. 10,601,906.

(30) Foreign Application Priority Data

Aug. 25, 2016 (KR) .................. 10-2016-0108373
Aug. 25, 2016 (KR) .................. 10-2016-0108376

(51) Int. Cl.
*H04L 29/08* (2006.01)
*H04L 12/803* (2013.01)
(Continued)

(52) U.S. Cl.
CPC ........ *H04L 67/1008* (2013.01); *H04L 47/125* (2013.01); *H04L 49/25* (2013.01);
(Continued)

(58) Field of Classification Search
CPC .................. H04L 67/1004; H04L 67/1008
See application file for complete search history.

(56) References Cited

U.S. PATENT DOCUMENTS 8,213,313 B1 7/2012 Doiron et al.
8,266,204 B2 9/2012 Bansal et al.
(Continued)

FOREIGN PATENT DOCUMENTS

CN   104660664    5/2015
JP   2012-528551  11/2012
(Continued)

OTHER PUBLICATIONS

Notification of Reason for Refusal dated Apr. 29, 2018, in Korean Patent Application No. 10-2016-0108373.
(Continued)

*Primary Examiner* — Nicholas P Celani
(74) *Attorney, Agent, or Firm* — H.C. Park & Associates, PLC

(57) ABSTRACT

A method to load balance via a load balancing node in a virtual network environment, the method including: receiving a request packet from a client through a router; selecting, via a load balancer of the load balancing node, a backend virtual machine server to receive the received request packet; generating, via a virtual switch of the load balancing node, a packet for virtual networking by overlaying information for transmitting the received request packet to the selected backend virtual machine server through a virtual network to the received request packet; and transmitting the generated packet for virtual networking to a hypervisor node including the selected backend virtual machine server.

19 Claims, 19 Drawing Sheets

(51) Int. Cl.
  *H04L 12/947* (2013.01)
  *H04L 12/931* (2013.01)
  *H04L 12/46* (2006.01)
  *H04L 29/06* (2006.01)
  *H04L 67/1008* (2022.01)
  *H04L 47/125* (2022.01)
  *H04L 49/25* (2022.01)
  *H04L 49/00* (2022.01)
  *H04L 67/1027* (2022.01)
  *H04L 67/01* (2022.01)
  *H04L 69/22* (2022.01)
  *H04L 69/326* (2022.01)

(52) U.S. Cl.
  CPC .......... *H04L 49/70* (2013.01); *H04L 12/4641* (2013.01); *H04L 67/1027* (2013.01); *H04L 67/42* (2013.01); *H04L 69/22* (2013.01); *H04L 69/326* (2013.01)

(56) References Cited

U.S. PATENT DOCUMENTS

| | | | |
|---|---|---|---|
| 8,416,692 | B2 | 4/2013 | Patel et al. |
| 8,761,187 | B2 | 6/2014 | Barde |
| 9,686,179 | B2 | 6/2017 | Tatsumi |
| 10,050,807 | B2 | 8/2018 | Kinoshita et al. |
| 10,601,906 | B2 * | 3/2020 | Park .................. H04L 49/25 |
| 11,075,981 | B2 * | 7/2021 | Park .................. H04L 67/1004 |
| 2002/0120743 | A1 | 8/2002 | Shabtay et al. |
| 2010/0131636 | A1 | 5/2010 | Suri et al. |
| 2010/0302940 | A1 | 12/2010 | Patel et al. |
| 2011/0225231 | A1 | 9/2011 | Bansal et al. |
| 2012/0246637 | A1 * | 9/2012 | Kreeger ............... H04L 49/70 718/1 |
| 2013/0159487 | A1 * | 6/2013 | Patel .................. H04L 61/2007 709/223 |
| 2013/0238802 | A1 | 9/2013 | Sarikaya |
| 2013/0346531 | A1 | 12/2013 | Hummel et al. |
| 2014/0059111 | A1 | 2/2014 | Veeraiyan |
| 2014/0108661 | A1 | 4/2014 | Tang et al. |
| 2014/0207968 | A1 | 7/2014 | Kumar et al. |
| 2014/0359698 | A1 * | 12/2014 | Sorenson, III .......... H04L 63/10 726/1 |
| 2015/0029848 | A1 | 1/2015 | Jain |
| 2015/0063353 | A1 | 3/2015 | Kapadia et al. |
| 2015/0142909 | A1 | 5/2015 | Lee |
| 2015/0180715 | A1 | 6/2015 | Ozawa et al. |
| 2015/0189009 | A1 * | 7/2015 | van Bemmel ........ H04L 67/141 709/226 |
| 2015/0350081 | A1 | 12/2015 | Decusatis et al. |
| 2016/0014241 | A1 | 1/2016 | Tai |
| 2016/0080259 | A1 | 3/2016 | Biancaniello |
| 2016/0094513 | A1 | 3/2016 | Friedel et al. |
| 2016/0119230 | A1 | 4/2016 | Benny et al. |
| 2016/0149774 | A1 | 5/2016 | Chastain |
| 2016/0234091 | A1 | 8/2016 | Emmadi et al. |
| 2018/0063231 | A1 | 3/2018 | Park |

FOREIGN PATENT DOCUMENTS

| | | |
|---|---|---|
| JP | 2015-039135 | 2/2015 |
| JP | 2015-115781 | 6/2015 |
| JP | 2015-122680 | 7/2015 |
| JP | 2015-533458 | 11/2015 |
| JP | 2016-100739 | 5/2016 |
| KR | 10-2002-0069489 | 9/2002 |
| KR | 10-1504330 | 3/2015 |
| WO | 2014136864 | 9/2014 |

OTHER PUBLICATIONS

Notification of Reason for Refusal dated May 17, 2018, in Korean Patent Application No. 10-2016-0108376.
Office Action dated Aug. 28, 2018, in Japanese Patent Application No. 2017-159985.
Office Action dated Aug. 28, 2018, in Japanese Patent Application No. 2017-160060.
Non-Final Office Action dated Feb. 25, 2019, in U.S. Appl. No. 15/685,685.
Final Office Action dated Sep. 18, 2019, in U.S. Appl. No. 15/685,685.
Notification of Reasons for Refusal dated Apr. 29, 2018, in Korean Patent Application No. 10-2016-0108374.
Decision to Grant Patent dated Nov. 20, 2018, in Korean Patent Application No. 10-2016-0108373.
Decision to Grant Patent dated Nov. 20, 2018, in Korean Patent Application No. 10-2016-0108374.
Decision to Grant Patent dated Nov. 20, 2018, in Korean Patent Application No. 10-2016-0108376.
Decision to Grant Patent dated Feb. 19, 2019, in Japanese Patent Application No. 2017-160060.
Decision to Grant Patent dated Feb. 19, 2019, in Japanese Patent Application No. 2017-159985.
Notice of Allowance dated Nov. 14, 2019, in U.S. Appl. No. 15/685,418.
Final Office Action dated Oct. 15, 2020, in U.S. Appl. No. 15/685,685.
Non-Final Office Action dated Feb. 27, 2020, in U.S. Appl. No. 15/685,685.
Notice of Allowance dated Apr. 1, 2021, in U.S. Appl. No. 15/685,685.

* cited by examiner

METHOD AND SYSTEM FOR PROCESSING LOAD BALANCING USING VIRTUAL SWITCH IN VIRTUAL NETWORK ENVIRONMENT

CROSS-REFERENCE TO RELATED APPLICATIONS

This application is a continuation of U.S. patent application Ser. No. 15/685,418, filed Aug. 24, 2017, which issued as U.S. Pat. No. 10,601,906, and claims priority to and the benefit of Korean Patent Application No. 10-2016-0108373, filed Aug. 25, 2016, and Korean Patent Application No. 10-2016-0108376, filed Aug. 25, 2016, each of which is hereby incorporated by reference for all purposes as if fully set forth herein.

BACKGROUND

Field

The disclosure generally relates to a method and a system for processing direct server return load balancing using a loopback interface in a virtual network environment and a computer program stored in a computer readable media to implement a load balancing process connected to a computing node.

Discussion

A layer 4 (L4) load balancer is a networking device capable of distributing load to backend servers by dividing and distributing connections or sessions to the backend servers for layer 4 protocols, such as transmission control protocol (TCP), user datagram protocol (UDP), and the like. For example, Korean Unexamined Publication No. 10-2002-0069489 describes a method of connecting a client to a server, a method of operating a load balancer, and a method of packet transmission.

For instance, FIG. 1 illustrates a conventional operation of an L4 load balancer. As seen in FIG. 1, a networking environment may include a network address translation (NAT) node (or NAT) 110, a router 120, an L4 load balancer 130, a first backend server 140, a second backend server 150, and a third backend server 160. The NAT 110 is an address translator of a communication network for reducing depletion of public internet protocol (IP) addresses by translating a limited public IP address to a plurality of internal private IP addresses, and enhancing security against outside intrusion. The router 120 is a device helping a first communication network communicate with another (or second) communication network by connecting the networks regardless of a network configuration method or implemented protocol(s). The L4 load balancer 130 performs a role of distributing traffic, such as a hypertext transmission protocol (HTTP) request, from a client transmitted through the NAT 110 and the router 130 to at least one of the backend servers 140, 150, 160. In general, the L4 load balancer 130 is provided in a form that a software module for load balancing is combined with a hardware device to implement the L4 load balancing function(s).

Meanwhile, FIG. 2 illustrates a conventional operation of an L4 load balancer that also perform a NAT operation. As seen in FIG. 2, a networking environment includes a router 210, an L4 load balancer 220 including a NAT function, a first backend server 230, a second backend server 240, and a third backend server 250. Comparing FIGS. 1 and 2, a public network and a private network are separated based on the NAT 110 in FIG. 1, and a public network and a private network are separated based on the L4 load balancer 220 including the NAT function in FIG. 2. The backend servers 140, 150, 160, 230, 240, 250 may not know an address, e.g., IP address, of a client in each of the network environments described in association with FIGS. 1 and 2. Also, latency increases at least because requests (or responses) of the backend servers 140, 150, 160, 230, 240, 250 are transmitted to the client through the L4 load balancer 130 or the L4 load balancer 220 including the NAT function.

Technology for a response in a backend server that does not go through a load balancer that also reduces latency will be described in association with FIG. 3. That is, FIG. 3 illustrates a conventional operation of an L4 direct server return (DSR) load balancer. As seen in FIG. 3, a network environment includes a router 310, an L4 DSR load balancer 320, a first backend server 330, a second backend server 340, and a third backend server 350. Backend servers 330, 340, 350 respectively include loopback interfaces 331, 341, 351. In this manner, each of the backend servers 330, 340, 350 may directly transfer (or transmit) virtual IP (VIP) traffic to the router 310 without going through the L4 DSR load balancer 320. In other words, because each of the backend servers 330, 340, 350 may directly manage the VIP traffic for load balancing and directly transfer a response to the router 310 without going through the L4 DSR load balancer 320, each of the backend servers 330, 340, 350 have an advantage in reducing latency. However, issues may arise with the loopback interfaces 331, 341, 351 being set in the backend servers 330, 340, 350. Also, because all of the equipment is in a public network and has knowledge of the IP address of a client, there can be scaling issues given that many public IP addresses are already allocated, and, as such, public IP addresses are relatively scarce. When, however, NAT is used to solve issues with depletion of public IP addresses, there is an issue that a backend server may not know the IP address of a client.

It is also noted that virtual private cloud (VPC) technology may enable an independent cloud environment to be configured as an exclusive rack for a customer. A service provider providing a service for the VPC may provide a service for a configuration of a private cloud for customer. A technology for load balancing in the VPC environment has a difference with the load balancing in a general network situation previously described in association with FIGS. 1 to 3. For example, the previously described load balancers and backend servers are provided as virtualized resources. Also, when the service provider provides the L4 DSR load balancer to gain an advantage of reduced latency, there is an issue that it is difficult to request and/or force setup of a loopback interface at each of the backend virtual machine servers in a configuration requested by customers.

The above information disclosed in this section is for understanding the background of the inventive concepts, and, therefore, may contain information that does not form prior art.

SUMMARY

Some exemplary embodiments are capable of providing a new load balancing process for load balancing in association with one or more backend virtual machine servers that are configured by a customer through a hypervisor (or virtual machine monitor) in a VPC environment via tunneling. This may reduce latency in the VPC environment.

Some exemplary embodiments are capable of providing a load balancing method and a load balancing system that customers do not need to directly set a loopback interface utilized by a backend virtual machine server in an VPC environment by implementing and providing a loopback interface through a virtual switch of a hypervisor. In this manner, a response of the backend virtual machine server in the VPC environment may be directly transferred to a router without going through (e.g., bypassing) a load balancer. This may reduce latency in the VPC environment.

Some exemplary embodiments are capable of providing a packet analysis method and packet analysis system that may collect and analyze all or select packets transmitted and received in a monitoring virtual machine for a desired backend virtual machine by mirroring the packets transmitted and received by the backend virtual machine to the monitoring virtual machine including a function for deep packet inspection (DPI) by using the above-noted virtual switch for load balancing.

Additional aspects will be set forth in the detailed description which follows, and, in part, will be apparent from the disclosure, or may be learned by practice of the inventive concepts.

According to some exemplary embodiments, a method to load balance via a load balancing node in a virtual network environment includes: receiving a request packet from a client through a router; selecting, via a load balancer of the load balancing node, a backend virtual machine server to receive the received request packet; generating, via a virtual switch of the load balancing node, a packet for virtual networking by overlaying information for transmitting the received request packet to the selected backend virtual machine server through a virtual network to the received request packet; and transmitting the generated packet for virtual networking to a hypervisor node including the selected backend virtual machine server.

According to some exemplary embodiments, a method to load balance via a hypervisor node in a virtual network environment includes: receiving, via a virtual network from a load balancing node including a load balancer, a packet for virtual networking, the packet for virtual networking having been generated, via a virtual switch of the load balancing node, by overlaying information to a request packet received from a client through a router by the load balancing node, the information enabling transmission of the request packet through the virtual network; extracting the request packet from the packet for virtual networking through a virtual switch for a backend virtual machine server selected by the load balancer among virtual switches of the hypervisor node; and transmitting the extracted request packet to the selected backend virtual machine server.

According to some exemplary embodiments, a non-transitory computer-readable media including a computer program is provided to implement a method for processing load balancing in conjunction with a load balancing node implemented via a computer, the method including: receiving a request packet from a client through a router; selecting, via a load balancer of the load balancing node, a backend virtual machine server to receive the received request packet; generating, via a virtual switch of the load balancing node, a packet for virtual networking by overlaying information for transmitting the received request packet to the selected backend virtual machine server through a virtual network to the received request packet; and transmitting the generated packet for virtual networking to a hypervisor node including the selected backend virtual machine server.

According to some exemplary embodiments, a load balancing node implemented via a computer includes: at least one processor; and at least one memory including one or more sequences of one or more instructions configured to, in response to being executed by the at least one processor, cause the load balancing node at least to: receive a request packet from a client through a router; select, via a load balancer of the load balancing node, a backend virtual machine server to receive the received request packet; generate, via a virtual switch of the load balancing node, a packet for virtual networking via overlay of information for transmission of the received request packet to the selected backend virtual machine server through a virtual network to the received request packet; and transmit the generated packet for virtual networking to a hypervisor node comprising the selected backend virtual machine server.

According to various exemplary embodiments, load balancing for a backend virtual machine server configured by a customer may be processed using tunneling through a hypervisor in a VPC environment. In this manner, customers do not need to directly set a loopback interface, and a response of a backend virtual machine server may be transmitted to a router without going through a load balancer in the VPC environment by implementing and providing the loopback interface for the backend virtual machine server through a virtual switch of the hypervisor in the VPC environment. To this end, latency may be reduced.

According to various exemplary embodiments, packets transmitted and received by a desired backend virtual machine may be mirrored via the above-noted virtual switch for load balancing to a monitoring virtual machine that collects and analyzes the mirrored packets via, for example, a DPI function.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
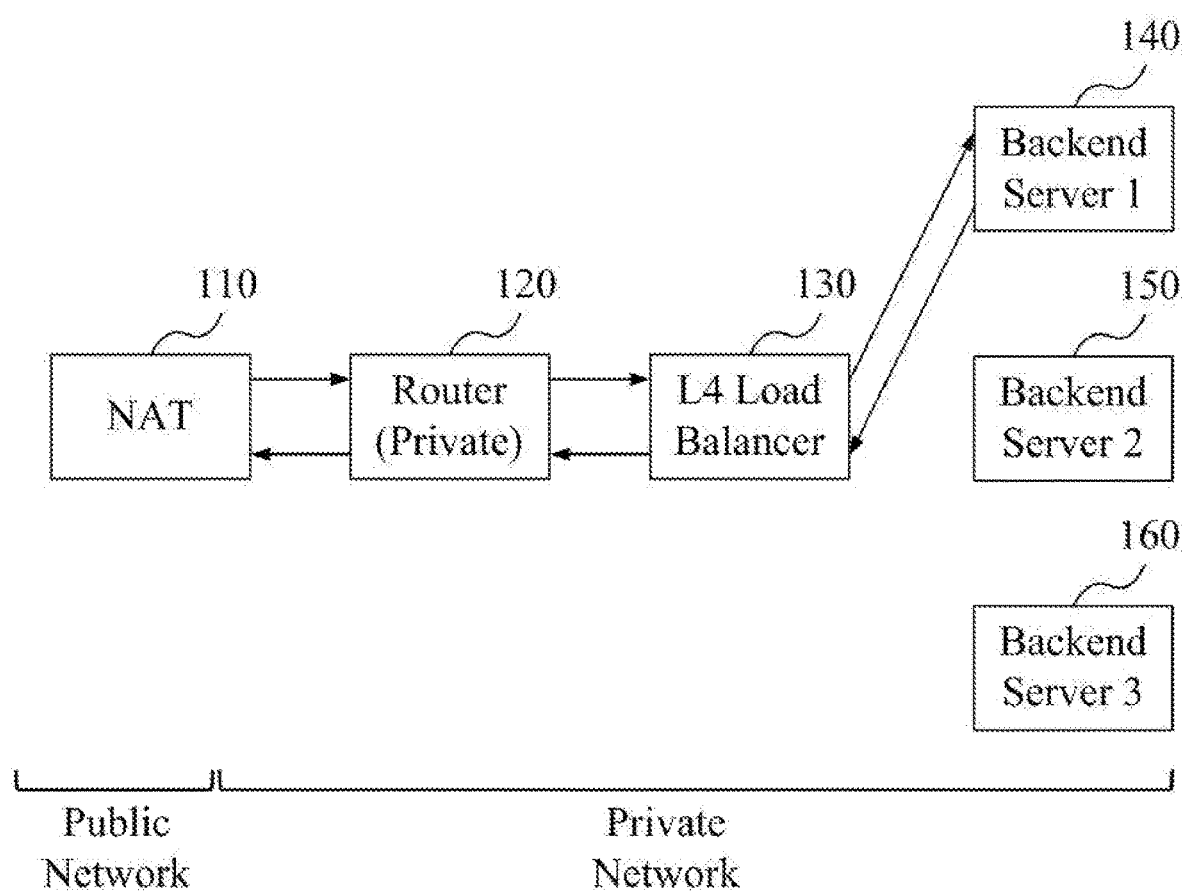
FIG. 1 illustrates a conventional operation of an L4 load balancer.
Figure 2:
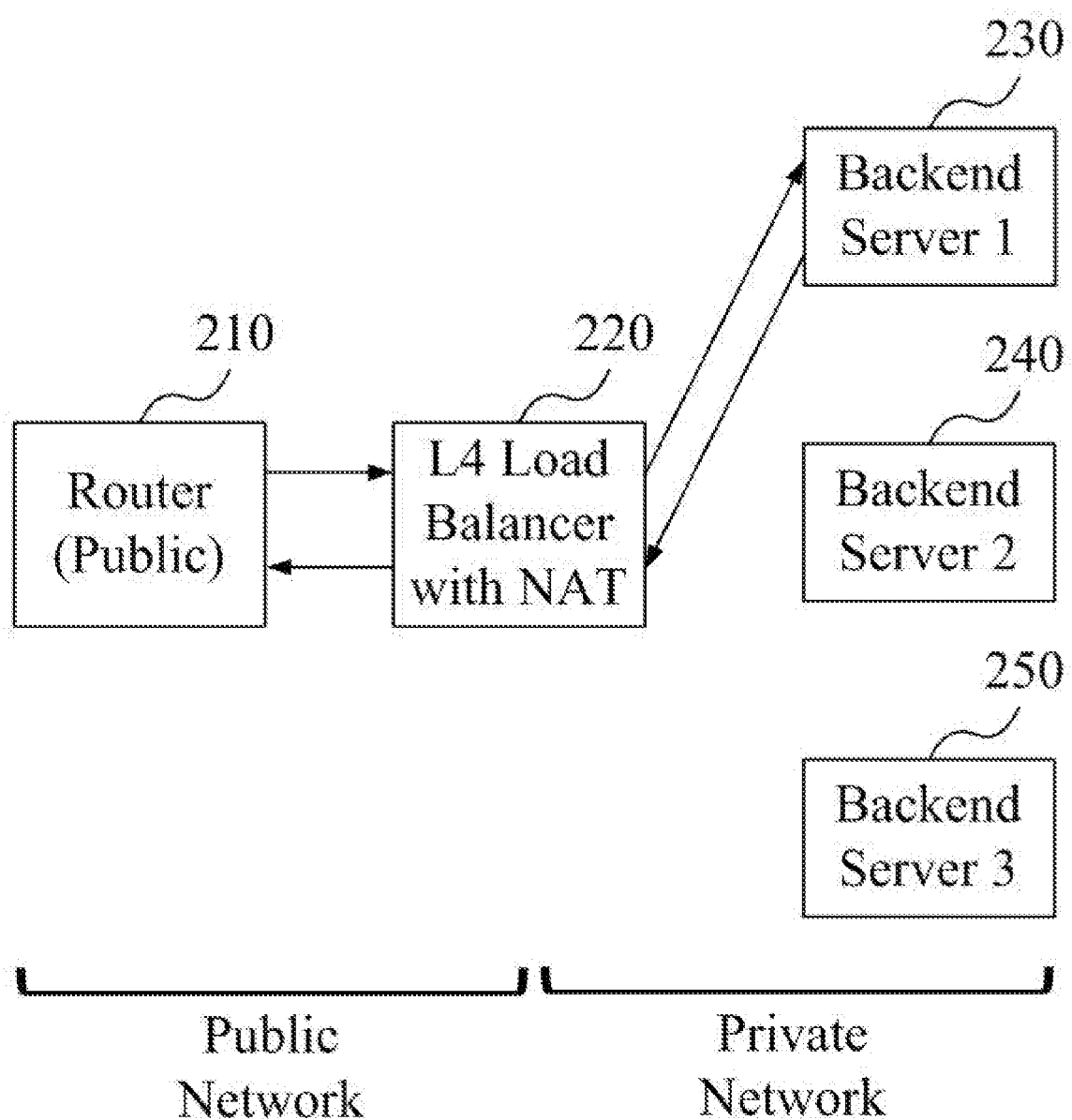
FIG. 2 illustrates a conventional operation of an L4 load balancer that also performs a NAT operation.
Figure 3:
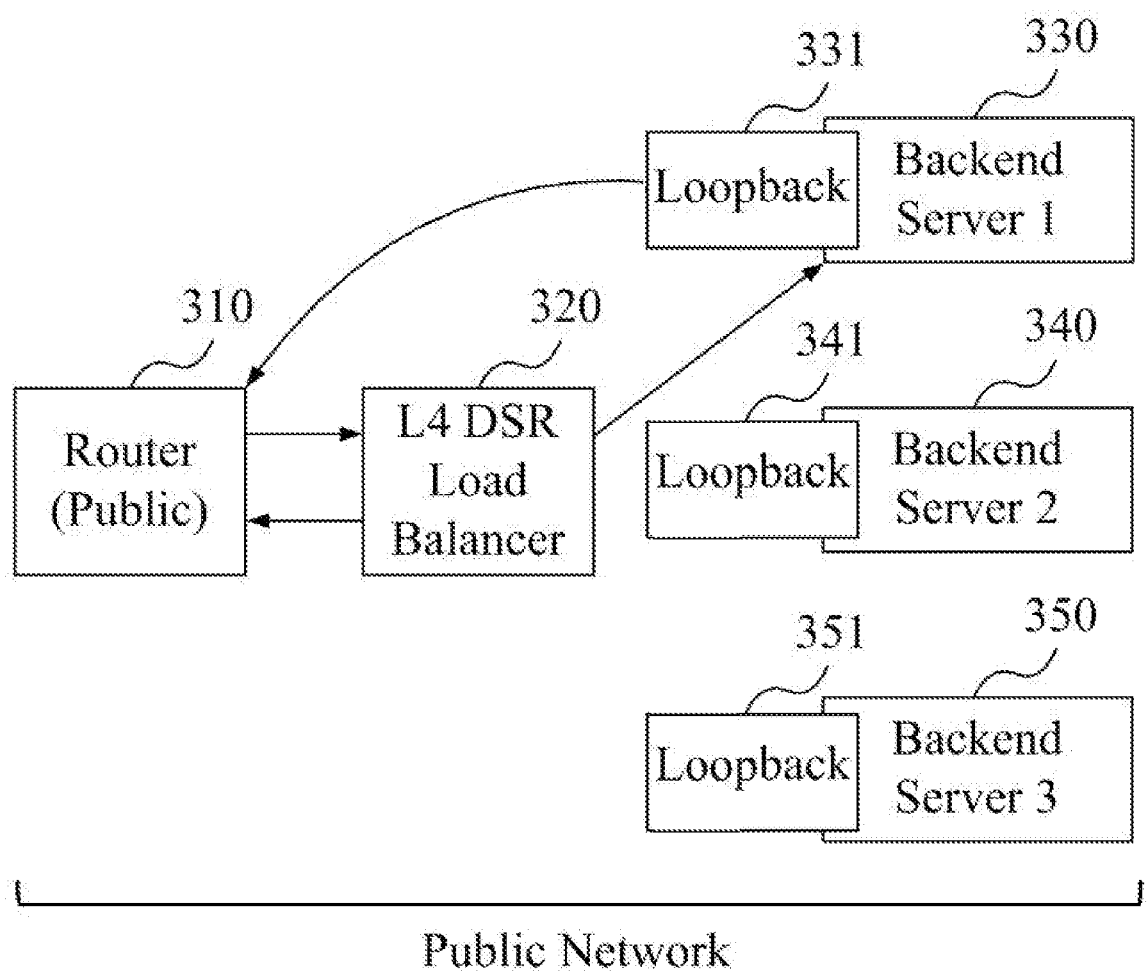
FIG. 3 illustrates a conventional operation of an L4 DSR load balancer.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, blocks, modules, layers, regions, aspects, etc. (hereinafter individually or collectively referred to as "elements"), of the various illustrations may be otherwise combined, separated, interchanged, and/or rearranged without departing from the spirit and the scope of the disclosure. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations or arrangements of an apparatus in use, operation, and/or manufacture in addition to the orientation/arrangement depicted in the drawings. For example, if an apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the spirit and scope of the inventive concepts. Further, the blocks, units, and/or modules of some exemplary embodiments may be physically combined into more complex blocks, units, and/or modules without departing from the spirit and scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, some exemplary embodiments will be described with reference to the accompanying drawings. It is noted that various exemplary embodiments relate to a load balancing method and a load balancing system for processing load balancing in a virtual network environment, e.g., a virtual private cloud (VPC) environment. Here, a real network of real nodes providing virtual resources and a virtual network of the virtual sources should be considered in the virtual network environment. As such, a real network of real nodes may refer to actual physical nodes (e.g., servers, routers, switches, etc.) including at least one physical network interface, whereas a virtual network of virtual resources may be provided by one or more physical nodes providing a virtual machine with a virtual physical network interface that connects the virtual machine to a virtual switch.

Figure 4:
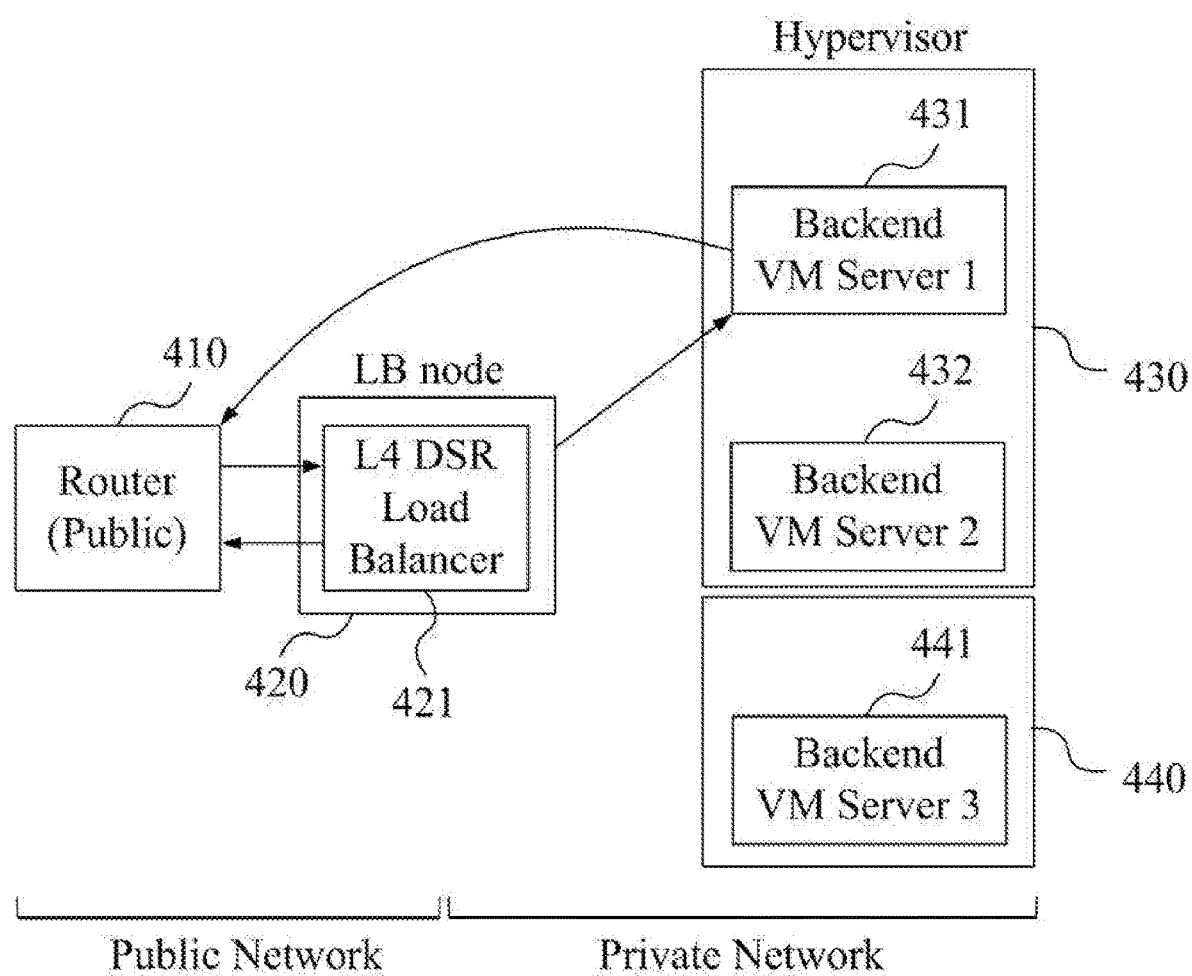
FIG. 4 illustrates an operation for L4 load balancing in a virtual network environment according to some exemplary embodiments.

FIG. 4 illustrates an operation for L4 load balancing in a virtual network environment according to some exemplary embodiments. Referring to FIG. 4, a networking environment includes a router 410, a load balancing (LB) node 420, and hypervisors 430, 440. The load balancing node 420 includes an L4 direct server return (DSR) load balancer 421, and functions as an interface between a public network and a private network. The hypervisors 430, 440 include a first backend virtual machine (VM) server 431, a second backend VM server 432, and a third backend VM server 441. Although FIG. 4 illustrates two hypervisors 430, 440 and three backend VM servers 431, 432, 441, exemplary embodiments are not limited thereto or thereby. In other words, any suitable number of hypervisors and backend VM servers may be utilized in association with exemplary embodiments, such as configured according to a customer's request and/or networking environment for a virtual network service.

According to some exemplary embodiments, the L4 DSR load balancer 421 and the backend VM servers 431, 432, 441 may be virtual resources, and a service provider of the virtual network may provide these virtual resources to customers according to desired conditions of the customers, e.g., according to customer service agreements. For example, for L4 DSR load balancing, the first backend VM server 431 may directly transmit a response according to a request of a client transmitted from the L4 DSR load balancer 421 without going back through L4 DSR load balancer 421. For processing of the L4 DSR load balancing, a function like a loopback interface may be set on the first backend VM server 431 as previously described. It is noted, however, that because the first backend VM server 431 is a virtual machine that allows customers to set and utilize functions according to their needs, it may be difficult for the service provider to enable the customers to request and/or force settings to control the loopback interface. Therefore, according to some exemplary embodiments, the customers may receive service for L4 DSR load balancing without an extra setting for the loopback interface by implementing a virtual switch in the hypervisors 430, 440 to process the operation of the loopback interface.

Figure 5:
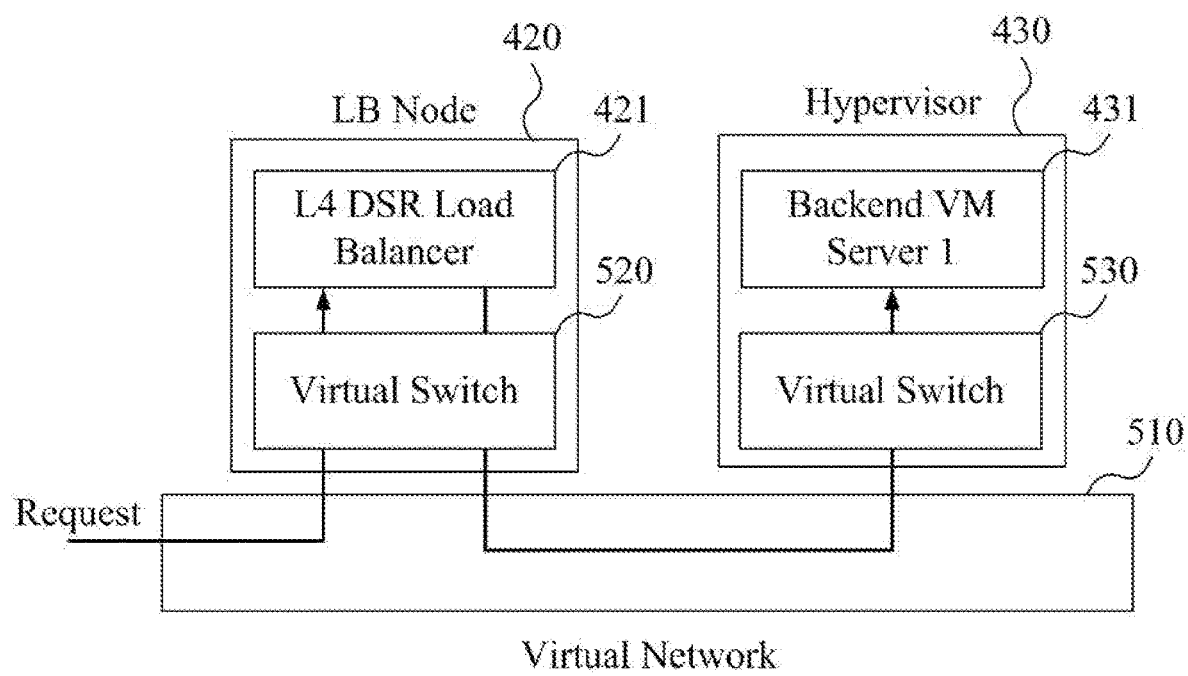
FIG. 5 illustrates a tunneling operation according to some exemplary embodiments.

FIG. 5 illustrates a tunneling operation according to some exemplary embodiments. As described above, the L4 DSR load balancer 421 included in the load balancing node 420 and the first backend VM server 431 included in the hypervisor 430 may be connected through a virtual network 510, but the load balancing node 420 and the hypervisor 430 may be separate, physical nodes respectively configured on a real network. In this manner, packets according to a request of a client may be transmitted to the load balancing node 420 through the real network, but may be transmitted from the load balancing node 420 to the hypervisor 430 through the virtual network. For this, virtual switches 520, 530 may be used as a virtual network layer in some exemplary embodiments.

For example, the L4 DSR load balancer 421 may select the first backend VM server 431 to process a request packet according to a request of a client. To transmit the request packet to the first backend VM server 431, the virtual switch 520 may generate a packet for virtual networking by overlaying (or appending) information for virtual networking (e.g. header information for virtual networking) to (or on) the request packet. In other words, the request packet may be encapsulated to (or in) the packet for virtual networking. For this, the load balancing node 420 may be implemented to process layer 2 information for a network protocol, such as Ethernet and the like, layer 3 information for a network protocol, such as IP, IPv6, and the like, and layer 4 information for a network protocol, such as TCP, UDP, and the like. For example, the virtual switch 520 may apply at least one virtual networking technology, e.g., a protocol, such as virtual extensible local area network (VxLAN), virtual LAN (VLAN), generic route encapsulation (GRE), 802.11br, and the like, as a method for overlaying and transmitting packets via the virtual network.

According to some exemplary embodiments, the virtual switch 530 included in the hypervisor 430 may extract a request packet in packets for virtual networking and transmit the extracted request packet to the first backend VM server 431 selected by the L4 DSR load balancer 421. In this case, because the request packet transmitted through the real network includes an address (e.g., IP address) of a sender (e.g., client), the first backend VM server 431 may receive information for the client. As such, the virtual switch 530 may be implemented to process the loopback operation, as previously described. For example, the response of the first backend VM server 431 according to the request of a client may be directly transmitted through the virtual switch 530 to the router 410 described in association with FIG. 4, and, thereby, not through the load balancing node 420. In other words, the response may bypass the load balancing node 420, and, thereby, reduce latency.

Figure 6:
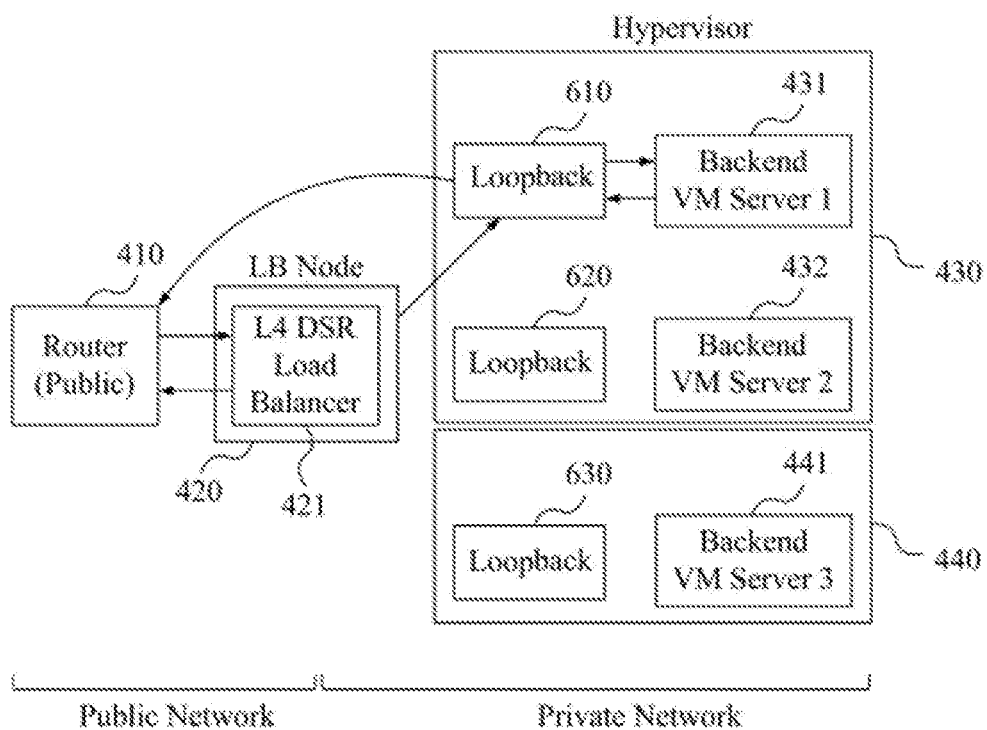
FIG. 6 illustrates an operation for L4 DSR load balancing in a virtual network environment using a loopback according to some exemplary embodiments.

FIG. 6 illustrates an operation for L4 DSR load balancing in a virtual network environment using a loopback according to some exemplary embodiments. As seen in FIG. 6, a networking environment includes the router 410, the load balancing node 420, the hypervisors 430, 440, the L4 DSR load balancer 421, the first backend VM server 431, the second backend VM server 432, and the third backend VM server 441 described in association with FIG. 4. In addition, the networking environment of FIG. 6 further includes loopback modules 610, 620, 630 respectively associated with the backend VM servers 431, 432, 441. The loopback modules 610, 620, 630 may be implemented to each of the virtual switches that the hypervisors 430, 440 include for the backend VM servers 431, 432, 441.

For example, as described in association with FIG. 5, the loopback module 610 for the first backend VM server 431 may be implemented to the virtual switch 530. For example, a request packet transmitted to the load balancing node 420 through the router 410 may be transmitted to the first backend VM server 431 by going through the virtual switch 520 included in load balancing node 420 in association with the L4 DSR load balancer 421. The request packet may be transmitted to the first backend VM server 431 from the load balancing node 420 through a tunneling operation as previously described. A response packet of the first backend VM server 431, which received the request packet, may be directly transmitted to the router 410 through the loopback module 610 without going through the L4 DSR load balancer 421 included in the load balancing node 420. As previously described, because the first backend VM server 431 may know the IP address of the client, the loopback module 610 may directly transmit the response packet to the router 410 without going through the load balancing node 420 by using the IP address of the client. Accordingly, latency may be reduced at least because the process in which the response packet goes back through the load balancing node 420 as part of the tunneling may be omitted.

According to some exemplary embodiments, the virtual switch may not be set in the hypervisors 430, 440. In this case, a top-of-rack (ToR) switch may perform a role of the virtual switch, and an operation for the loopback interface may be performed in the ToR switch.

Figure 7:
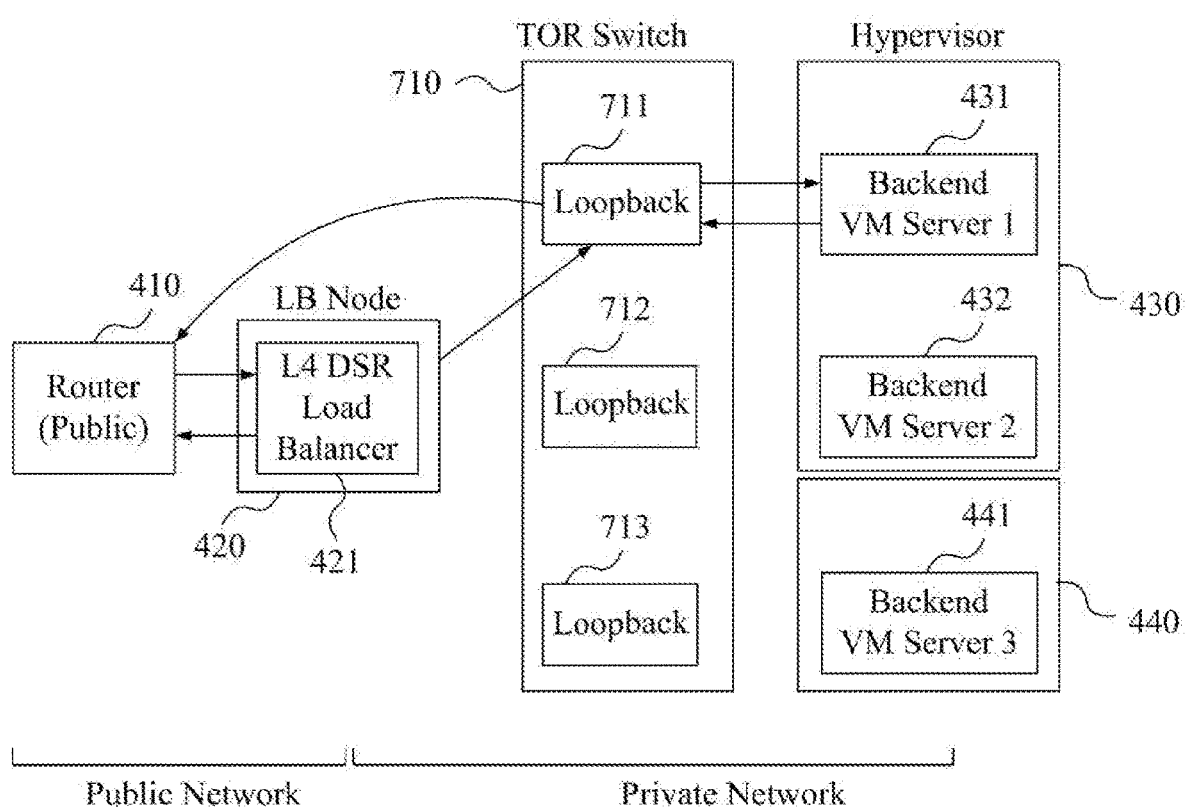
FIG. 7 illustrates an operation for L4 DSR load balancing in a virtual network environment using a TOR switch according to some exemplary embodiments.

FIG. 7 illustrates an operation for L4 DSR load balancing in a virtual network environment using a ToR switch according to some exemplary embodiments. As seen in FIG. 7, a networking environment includes the router 410, the load balancing node 420, the hypervisors 430, 440, the L4 DSR load balancer 421, the first backend VM server 431, the second backend VM server 432, and the third backend VM server 441 described in association with FIG. 4. In addition, the networking environment of FIG. 7 further includes a ToR switch 710. To this end, loopback modules 711, 712, 713 may be configured for the backend VM servers 431, 432, 441 in the TOR switch 710 used in the virtual network. In this manner, a virtual switch may not be set in the hypervisors 430, 440.

As described in association with FIG. 5, the request packet from the client that the load balancing node 420 transmits may be transmitted to at least one of the backend VM servers 431, 432, 441 through tunneling. For example, the load balancing node 420 may transmit the request packet from the client to the first backend VM server 431 through the L4 DSR load balancer 421 and the virtual switch (e.g. the virtual switch 520 of FIG. 5) by going through the loopback module 711 configured in the ToR switch 710 through tunneling. Also, the loopback module 711 may reduce latency by transmitting the response packet from the first backend VM server 431 directly to the router 410 through tunneling without going back through the load balancing node 420.

Likewise, in some exemplary embodiments, transmitting of packets between the load balancing node 420 and the backend VM servers 431, 432, 441 may be processed through tunneling using a virtual switch in a virtual network environment. Also, latency may be reduced by enabling DSR load balancing without setting a loopback interface to each of the backend VM servers 431, 432, 441 by customers by providing a process for loopback interface through at least one virtual switch. Also, because the address (e.g., IP address) of the sender is transmitted to the backend VM servers 431, 432, 441, the information for the client may be obtained in (or known by) the backend VM servers 431, 432, 441 for a direct response that bypasses the load balancing node 420.

Figure 8:
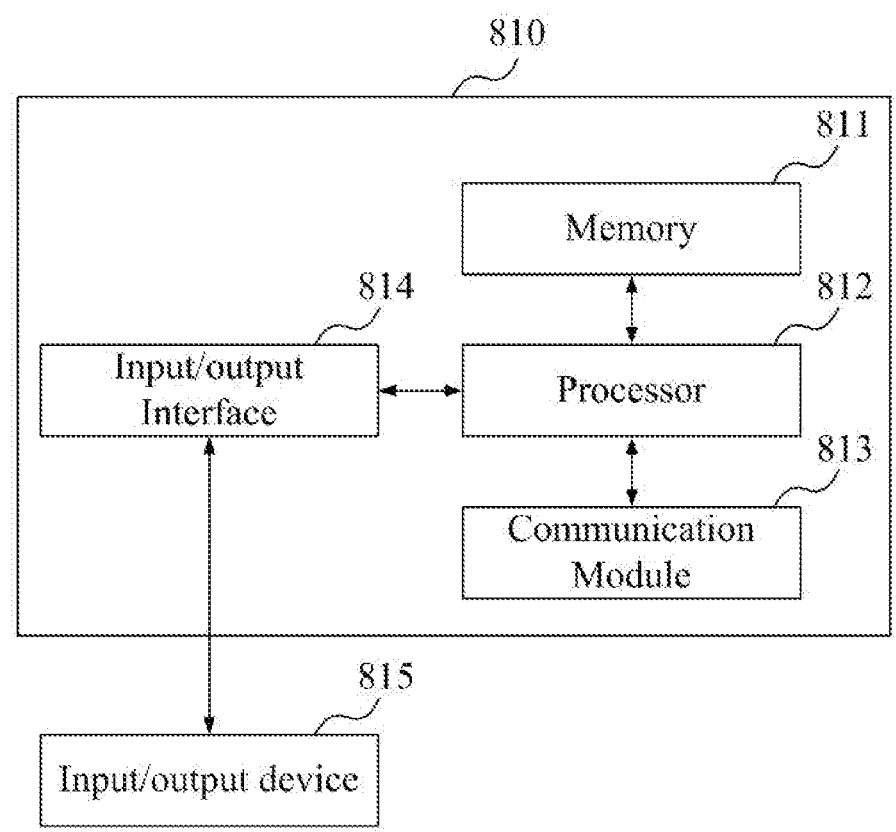
FIG. 8 is a block diagram of a physical node for configuring a virtual network environment according to some exemplary embodiments.

FIG. 8 is a block diagram of a physical node for configuring a virtual network environment according to some exemplary embodiments. Although one physical node (or node) 810 is described in association with FIG. 8, other physical nodes for configuring a virtual network environment may have the same or similar configuration as the node 810.

As shown in FIG. 8, the node 810 may include a memory 811, a processor 812, a communication module 813, and input/output interface 814. As a computer-readable media, the memory 811 may include a permanent mass storage device, such as random access memory (RAM), read only memory (ROM), and disk drive. The ROM and the permanent mass storage device may be divided from the memory 811, and, thereby, included as a separate device. Also, the memory 811 may store an operating system and at least one program code or instruction (e.g. program, software module code, one or more sequences of one or more instructions, etc. for implementing the L4 load balancer 421 and the virtual switch 520 by the load balancing node 420). The software components may be loaded from a separate computer-readable media from the memory 811. The separate computer-readable media may include a computer-readable media, such as a floppy drive, disc, tape, DVD/CD-ROM drive, memory card, etc. In some exemplary embodiments, the software components may be loaded to the memory 811 through the communication module 813 instead of (or in addition to) the computer-readable media.

The processor 812 may be configured to process instructions of computer program code by performing basic arithmetic, logic, and input/output operations. The instructions may be provided to the processor 812 by the memory 811 and/or the communication module 813. For example, the processor 812 may be configured to implement the instructions received in accordance with a program code stored in a recording device, such as the memory 811. As a more specific example, a service provider providing a VPC service by using node 810 may input an instruction for implementing an L4 DSR load balancer (e.g., L4 DSR load balancer 420) and a virtual switch (e.g., virtual switch 520) through the communication module 813 according to the customer's request for providing a load balancing service. The processor 812 of the node 810 may implement the L4 DSR load balancer and the virtual switch according to the inputted instruction and the instruction of the computer program stored in the memory 811, and provide the load balancing service to a designated backend VM server (e.g., backend VM server 431) of the customer.

The communication module 813 may provide a function for communicating with other physical nodes through a real network. For example, a packet (e.g., a packet for transmitting traffic to a backend VM server, such as backend VM server 431) that the processor 812 of the node 810 generates according to the program code stored in the recording device, such as the memory 811, may be transmitted to other physical node(s) through the real network according to control of the communication module 813. Conversely, the packet from other physical node(s) may be received through the communication module 813 and transmitted to the processor 812 or the memory 811 of the node 810.

The input/output interface 814 may enable interface with the input/output device 815. For example, an input device may include a device, such as keyboard, mouse, etc., and an output device may include a device, such as display. Also, in some exemplary embodiments, the node 810 may include additional and/or alternative components other than the components of FIG. 8 that would be recognized by one of ordinary skill in the art. For example, the node 810 may be configured including various components, such as physical buttons, touch panel user interface, one or more input/output ports, and the like.

Exemplary load balancing processes executed via a load balancing node will now be described in association with FIGS. 9 and 10.

Figure 9:
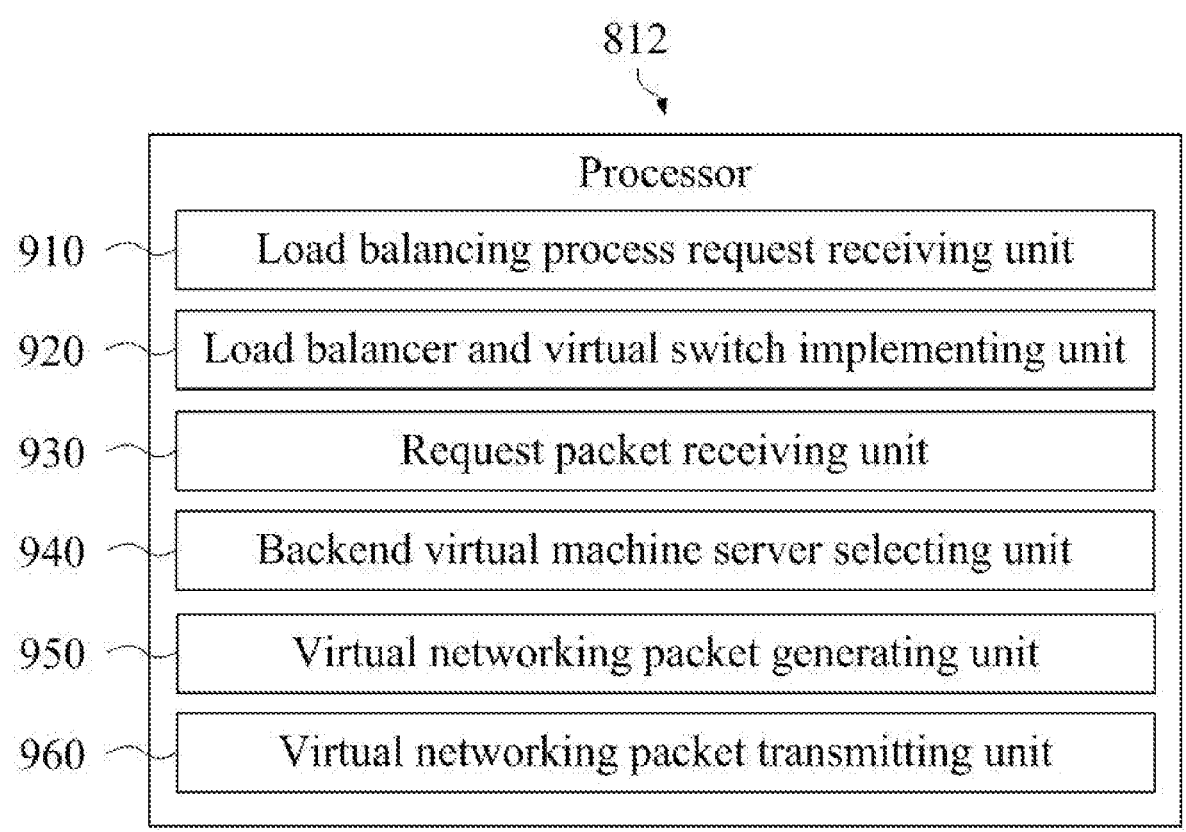
FIG. 9 is a block diagram of processor components of a physical node for a load balancing node in a virtual network environment according to some exemplary embodiments.
Figure 10:
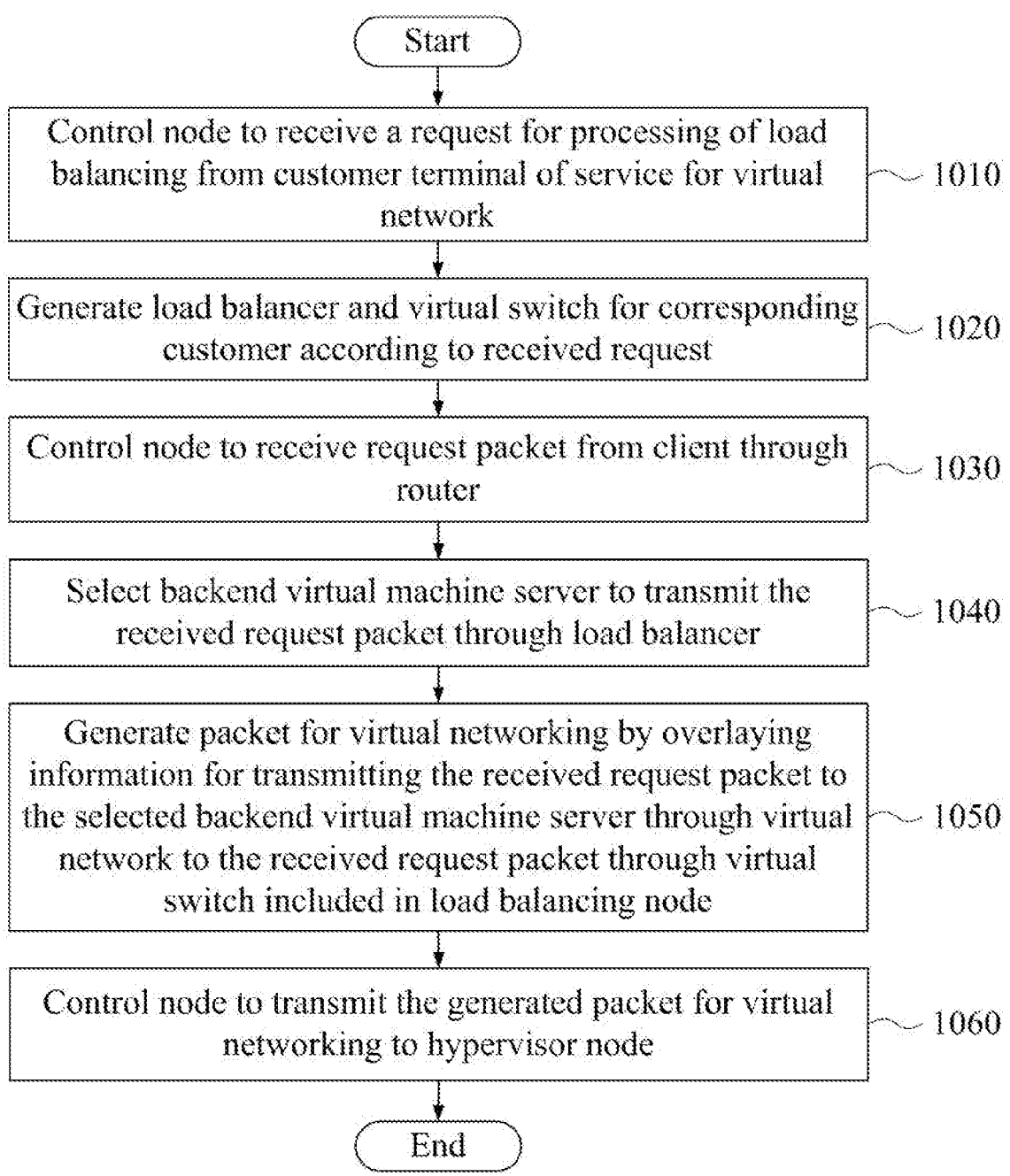
FIG. 10 is a flowchart of a method of a load balancing node according to some exemplary embodiments.

FIG. 9 is a block diagram of processor components of a physical node for load balancing node in a virtual network environment according to some exemplary embodiments, and FIG. 10 is a flowchart of a method of a load balancing node according to some exemplary embodiments.

According to some exemplary embodiments, the node 810 may correspond to the load balancing node described above, and may be a physical device for configuring an L4 DSR load balancer and a virtual switch. The processor 812 included in the node 810 may include a load balancing process request receiving unit 910, a load balancer and virtual switch implementing unit 920, a request packet receiving unit 930, a backend VM server selecting unit 940, a virtual networking packet generating unit 950, and a virtual networking packet transmitting unit 960.

The processor 812 and the various components of the processor 812 may perform operations 1010 to 1060 in the method of FIG. 10. The processor 812 and the various components of the processor 812 may be implemented to execute instructions according to the operating system code and/or the at least one program code included in, for instance, the memory 812. The various components of the processor 812 may be expressions of different functions of the processor 812 performed by the processor 812 according to control instructions provided by program code stored in the node 810. Here, the processor 812 may read control instructions from the memory 812 including instructions relating to control of the node 810, and may control the node 810 to perform the operations 1010 to 1060 described hereinafter according to the read control instructions.

In operation 1010, the load balancing process request receiving unit 910 may control the node 810 to receive a request for processing of load balancing from a customer terminal of a service for a virtual network. For example, a service provide for a virtual network may provide customers with virtual resources according to various requests of customer terminals through a real network. Here, the load balancing process request receiving unit 910 may receive the customer's request for processing of load balancing. According to some exemplary embodiments, a control device controlling physical devices of a virtual network may receive the request for processing of load balancing from the customer terminal. In this case, the load balancing process request receiving unit 910 may receive the customer's request from the control device.

In operation 1020, the load balancer and virtual switch implementing unit 920 may generate (or provision) a load balancer and a virtual switch that correspond with the customer's received request. The load balancer and the virtual switch may be generated (or implemented) in the form of virtual modules, which may be generated and provided using any suitable technology for, for instance, a VPC environment.

In operation 1030, the request packet receiving unit 930 may control the node 810 to receive the request packet from the client through the router. A client from the perspective of a service provider providing a service for a virtual network may provide service to clients, and may construct a plurality of backend VM servers for this. Here, the request for processing load balancing described in operation 1010 may include a customer process load balancing for the request of the clients. In this case, the request packet from the clients may be transmitted to the node 810 through a router of public network before being transmitted to the backend VM server, and the request packet receiving unit 930 may control the node 810 to receive the transmitted request packet.

In operation 1040, the backend VM server selecting unit 940 may select a backend VM server among one or more backend VM servers to transmit the received request packet through a load balancer. In other words, the backend VM server selecting unit 940 may allow the request packet to be distributed to the backend VM servers through the load balancer.

The load balancer may be a software module generated in operation 1020.

In operation 1050, the virtual networking packet generating unit 950 may generate a packet for virtual networking by overlaying information for transmitting the received request packet to the selected backend VM server through a virtual network to the received request packet through the virtual switch included in the load balancing node. The request packet is a packet transmitted through a real network. In this manner, header information and the like for a virtual networking protocol are utilized for transmitting traffic through a virtual network.

According to some exemplary embodiments, the virtual networking packet generating unit 950 may generate a packet for virtual networking by overlaying information, such as the header information for virtual networking to the received request packet. For example, the virtual networking packet generating unit 950 may generate a packet for virtual networking through tunneling by applying one of a virtual networking protocol among, for instance, VxLAN, VLAN, GRE, and 802.11br to the request packet in operation 1050. For this, the node 810 may be implemented to process layers 2, 3, and 4 of the network model, and the information overlaid to the request packet may include header information for layer 2 and layer 3 of the network model and header information for the virtual networking protocol. In this manner, the request packet initially transmitted via a real network may be encapsulated into a request packet capable of traversing a tunnel provisioned over the virtual network.

In operation 1060, the virtual networking packet transmitting unit 960 may control the node 810 to transmit the generated packet for virtual networking to the hypervisor node. Here, the hypervisor node may include the selected backend VM sever, receive the transmitted packet for virtual networking through virtual network, extract the request packet through a virtual switch for the selected backend VM server among the virtual switches included in the hypervisor node, and be implemented to transmit the extracted request packet to the selected backend VM server through the load balancer. Also, as described above, there is a case that the hypervisor node may not configure the virtual switch. In this case, the transmitted packet for virtual networking may be transmitted to a ToR switch, and transmitted to the hypervisor node by reconverting to the request packet through the virtual switch for the selected backend VM server among the virtual switches included in the ToR switch. Here, the hypervisor node may be implemented to transmit the reconverted request packet to the selected backend VM server.

According to some exemplary embodiments, the load balancer may include the L4 DSR load balancer. For this, the selected backend VM server may be implemented to directly transmit the response packet for the transmitted request packet to the router through the virtual switch for the selected backend VM server without going back through the L4 DSR load balancer. As already described, because the request packet includes the address (e.g., IP address) of the client, the address of the client may be transmitted to the selected backend VM server through the packet for virtual networking that the request packet is encapsulated in. As such, latency may be reduced at least because the backend VM server may directly transmit a response packet to the client, and, thereby, bypass the L4 DSR load balancer.

An exemplary reception process of a hypervisor node receiving a packet for virtual networking transmitted from the node 810 processing load balancing will be described in association with FIGS. 11 and 12.

Figure 11:
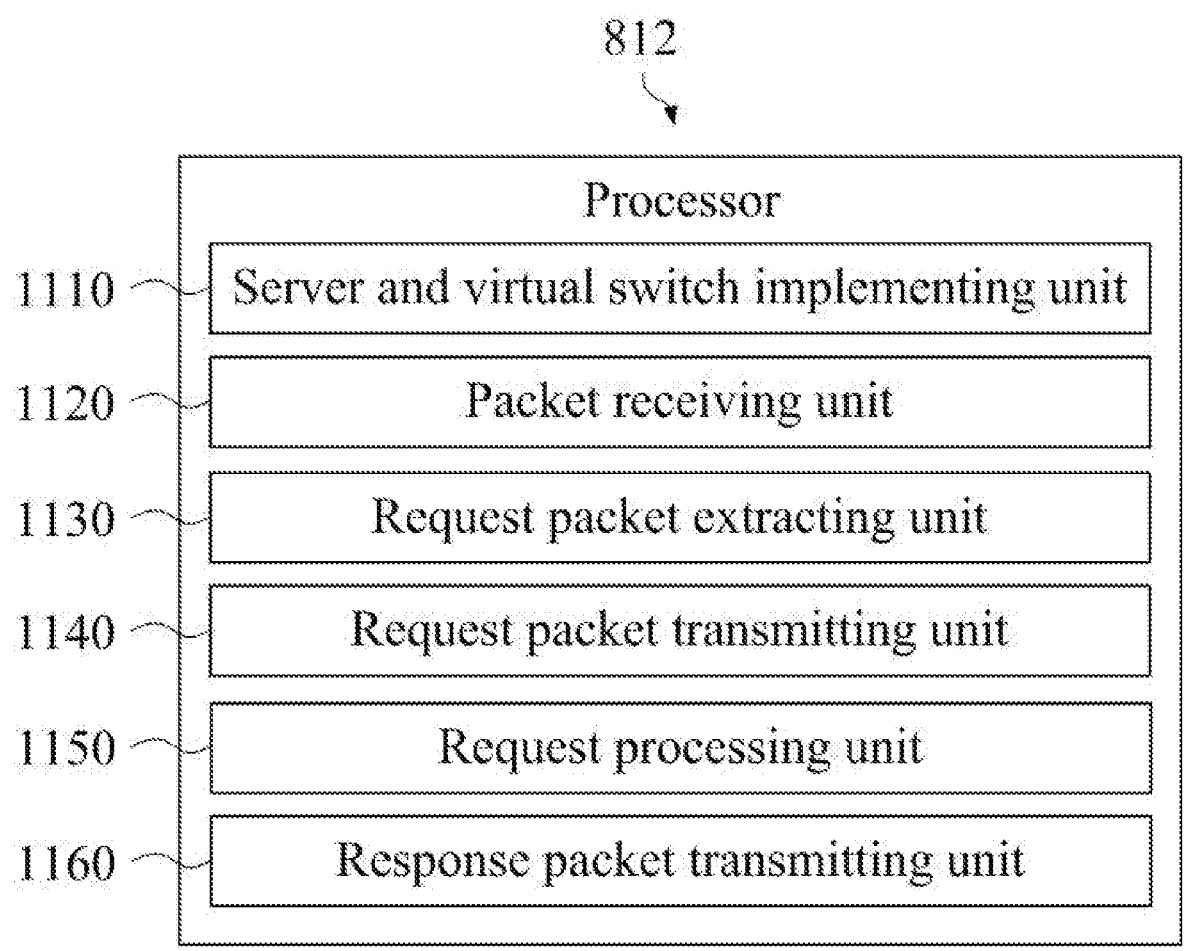
FIG. 11 a block diagram of processor components of a physical node for a hypervisor node in a virtual network environment according to some exemplary embodiments.
Figure 12:
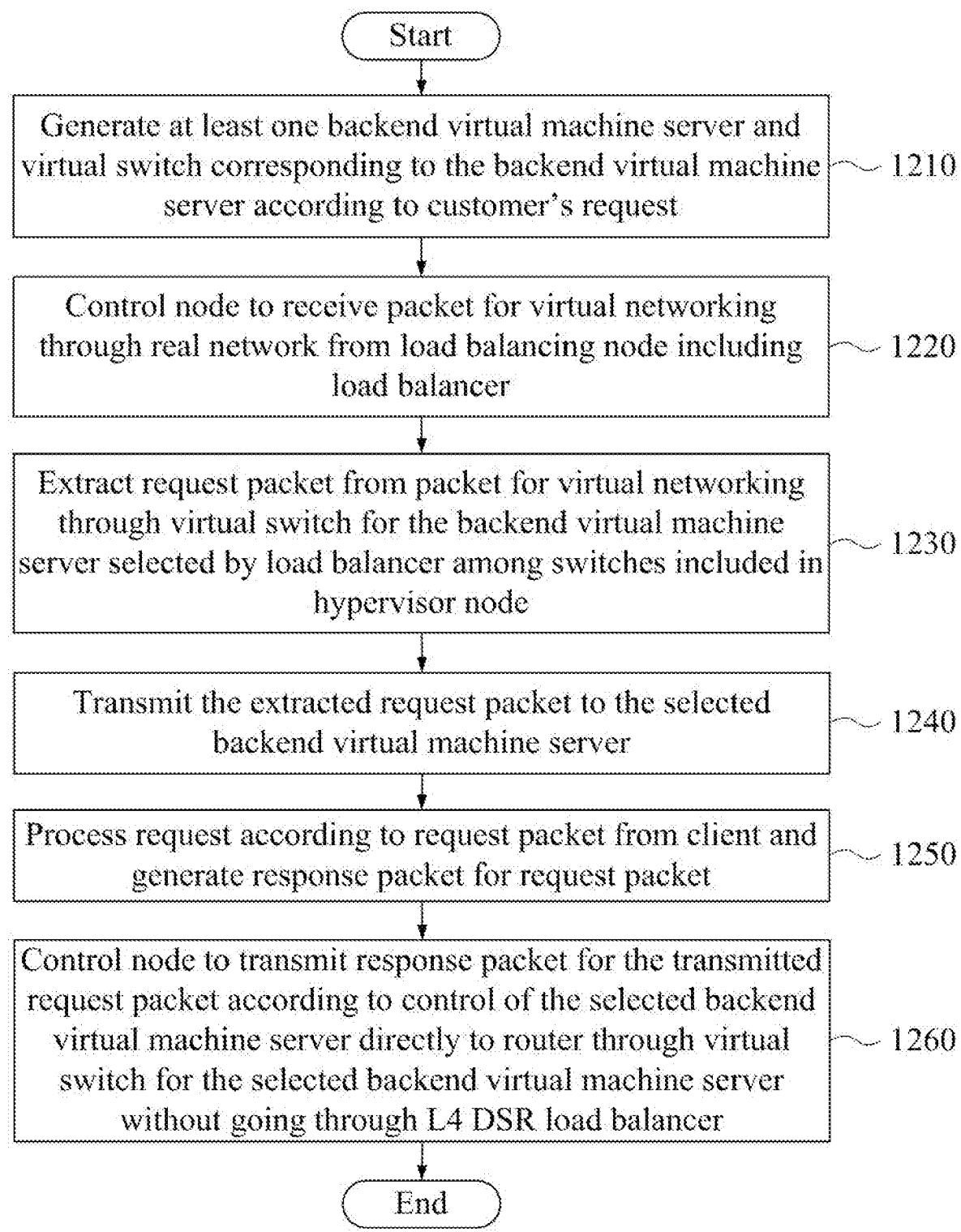
FIG. 12 is a flowchart of a method of a hypervisor node according to some exemplary embodiments.

FIG. 11 a block diagram of processor components of a physical node for a hypervisor node in a virtual network environment according to some exemplary embodiments, and FIG. 12 is a flowchart of a method of a hypervisor node according to some exemplary embodiments.

The node 810 may correspond to the hypervisor node described above, and may be a physical device for configuring at least one backend VM server and a virtual switch corresponding to each backend VM server. The processor 812 included in the node 810 may include a server and virtual switch implementing unit 1110, a packet receiving unit 1120, a request packet extracting unit 1130, a request packet transmitting unit 1140, a request processing unit 1150, and a response packet transmitting unit 1160.

The processor 812 and the various components of the processor 812 may perform operations 1210 to 1260 in the method of FIG. 12. The processor 812 and the various components of the processor 812 may be implemented to execute instructions according to an operating system code and/or at least one program code included in, for instance, the memory 811. The various components of the processor 812 may be expressions of different functions of the processor 812 performed by the processor 812 according to control instructions provided by a program code stored in the node 810. Here, the processor 812 may read control instructions from the memory 811 including instructions relating to control of the node 810, and may control the node 810 to perform operations 1210 to 1260 described hereinafter according to the read control instructions.

In operation 1210, the server and virtual switch implementing unit 1110 may generate (or provision) at least one backend VM server and a virtual switch corresponding to the backend VM server according to a customer's request. Each of the backend VM servers and the virtual switches may be generated as software modules.

In operation 1220, the packet receiving unit 1120 may control the node 810 to receive the packet for virtual networking through a real network from a load balancing node including a load balancer. Here, as already described, the packet for virtual networking may be generated by overlaying information to transmit the request packet through a virtual network to the request packet from the client that the load balancing node received through the router through the virtual switch included in the load balancing node.

In operation 1230, the request packet extracting unit 1120 may extract the request packet from the packet for virtual networking through the virtual switch for the backend VM server by the load balancer among the virtual switches included in the hypervisor node. At least because the packet for virtual networking encapsulates the request packet, the request packet extracting unit 1130 may receive the request packet by removing the overlaid information for virtual networking from the packet for virtual networking.

In operation 1240, the request packet transmitting unit 1140 may transmit the extracted request packet to the selected backend VM server. As already described, because the backend VM server has a form of a software module, real data transmission may not occur.

In operation 1250, the request processing unit 1150 may process a request according to the request packet from the client, and generate a response packet for the request packet. For example, the request processing unit 1150 may process the request packet according to control of the selected backend VM server having a form of a software module, and may generate the response packet.

In operation 1260, the response packet transmitting unit 1160 may control the node 810 to transmit the response packet for the request packet transmitted according to the control of the selected backend VM server directly to the router through the virtual switch for the selected backend VM server without going through the L4 DSR load balancer. Likewise, at least because the request packet does not go through the L4 DSR load balancer, there may be a benefit in reduced latency.

According to some exemplary embodiments, there is a case that the hypervisor node may not configure the virtual switch. In this case, as already described, the hypervisor node may receive the response packet from the packet for virtual networking by using a virtual switch configured in a ToR switch. For this, the hypervisor node may simply generate the backend VM server in operation 1210, and may receive the request packet from the ToR switch in operation 1220. To this end, operation 1230 may be omitted, and after passing through operations 1240 and 1250, the node may be controlled to transmit the response packet directly to the router using the virtual switch configured to the ToR switch in operation 1260.

Figure 13:
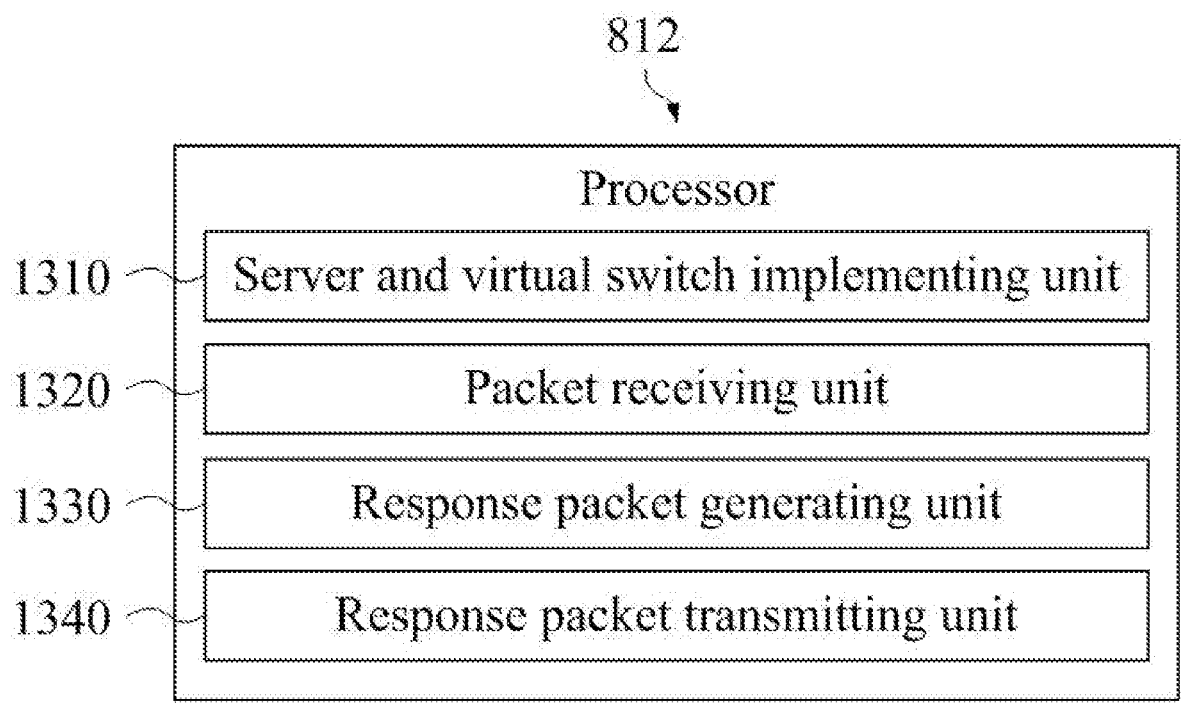
FIG. 13 is a block diagram of processor components of a physical node for a hypervisor node including a virtual switch in a virtual network environment according to some exemplary embodiments.
Figure 14:
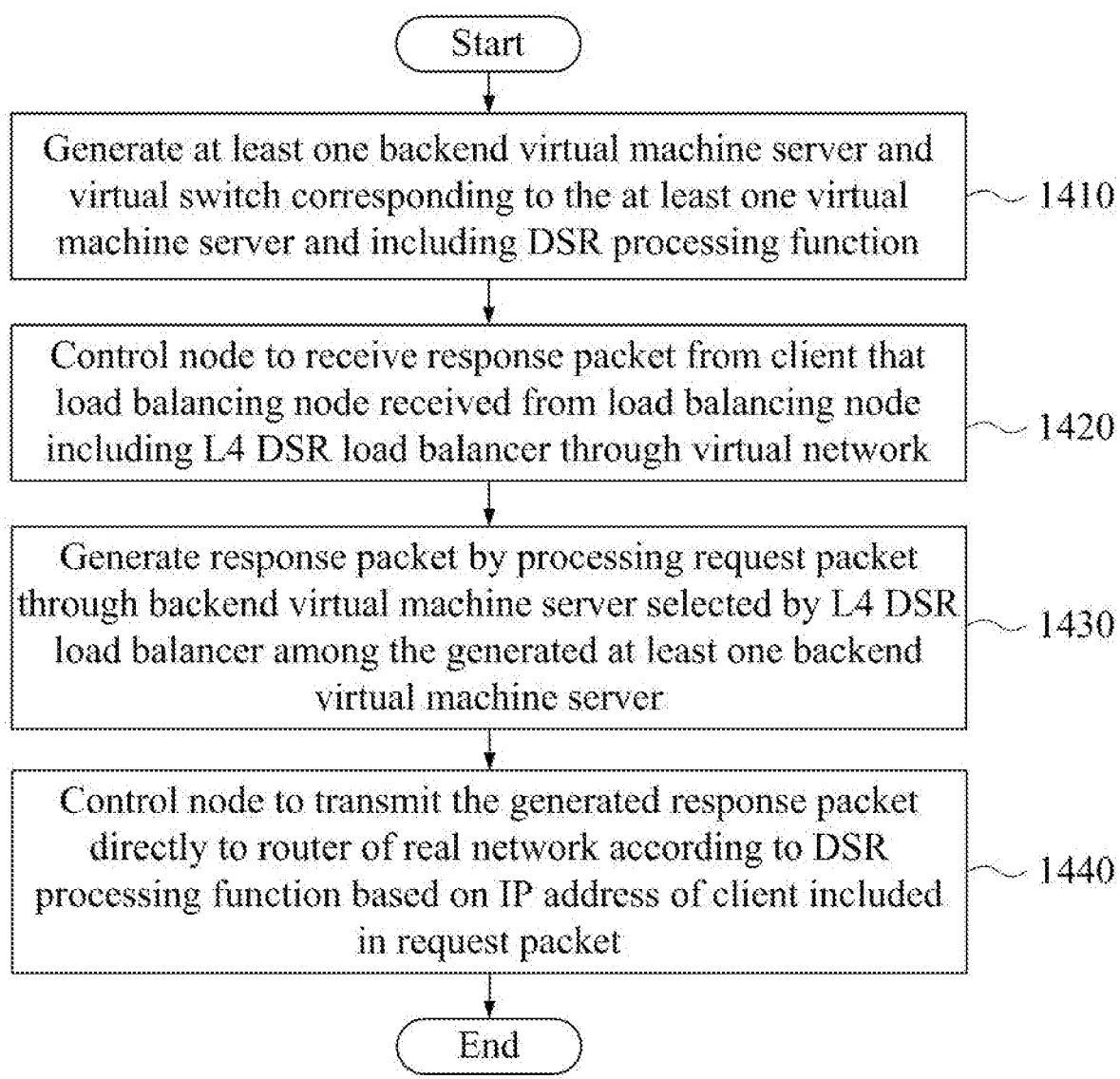
FIG. 14 is a flowchart of a method of a hypervisor node including a virtual switch according to some exemplary embodiments.

FIG. 13 is a block diagram of processor components of a physical node for a hypervisor node including a virtual switch in a virtual network environment according to some exemplary embodiments. FIG. 14 is a flowchart of a method of a hypervisor node including a virtual switch according to some exemplary embodiments.

According to some exemplary embodiments, the node 810 may correspond to the hypervisor node described above, and may be a physical device for configuring at least one backend VM server and a virtual switch corresponding to each backend VM server. The processor 812 included in the node 810 may include a server and virtual switch implementing unit 1310, a packet receiving unit 1320, a response packet generating unit 1330, and a response packet transmitting unit 1342.

The processor 812 and the various components of the processor 812 may perform operations 1410 to 1440 in the method of FIG. 14. The processor 812 and the various components of the processor 812 may be implemented to execute instructions according to an operating system code and/or at least one program code included in, for instance, the memory 811. The various components of the processor 812 may be expressions of different functions of the processor 812 performed by the processor 812 according to control instructions provided by a program code stored in the node 810. Here, the processor 812 may read control instructions from the memory 811 including instructions relating to control of the node 810, and may control the node 810 to perform operations 1410 to 1440 described hereinafter according to the read control instructions.

In operation 1410, the server and virtual switch implementing unit 1310 may generate (or provision) at least one backend VM server and a virtual switch corresponding to the at least one backend VM server and including a DSR processing function. For example, the server and virtual switch implementing unit 1310 may generate the backend VM server and provide the generated VM server to the hypervisor node as a form of virtual resources that a customer desires according to the customer's request. The service provider may provide a service to the client (e.g., customer) through the generated backend VM server. Also, the server and virtual switch implementing unit 1310 may generate a virtual switch corresponding to each of the generated backend VM servers. Here, the virtual switch may include the DSR processing function. The DSR processing function may include a function for transmitting a response packet for a request packet directly to a router of real network using an address (e.g., IP address) included in the request packet from the client as described hereinafter.

In operation 1420, the packet receiving unit 1320 may receive the request packet from the client that the load balancing node received through the router from a load balancing node including the L4 DSR load balancer. As described above, the request packet may be transmitted by overlaying information for transmitting the request packet through a virtual network to the request packet according to tunneling by applying a networking protocol among VxLAN, VLAN, GRE, and 802.11br. Here, the information overlaid to the request packet may include header information for layer 2 and layer 3 of the network model and header information for the virtual networking protocol.

In operation 1430, the response packet generating unit 1330 may generate a response packet by processing the request packet through the backend VM server selected by the L4 DSR load balancer among the generated at least one backend VM server. For example, the response packet generating unit 1330 may extract the request packet from the request packet overlaid with the information through the generated virtual switch, and transmit the extracted packet to the selected backend VM server. Also, the response packet generating unit 1330 may generate the response packet by processing the request packet through the selected backend VM server.

In operation 1440, the response packet transmitting unit 1340 may transmit the generated response packet according to the DSR processing function that the generated virtual switch includes to the router of the real network based on the address (e.g., IP address) of a client that the request packet includes. For example, the response packet transmitting unit 1340 may transmit the generated response packet directly to the router of the real network through the DSR processing function without going through the L4 DSR load balancer via the virtual network. In other words, the request packet is transmitted from the load balancing node through the virtual network, but the response packet for the request packet may be transmitted to the router of the real network and bypass the load balancing node.

Figure 15:
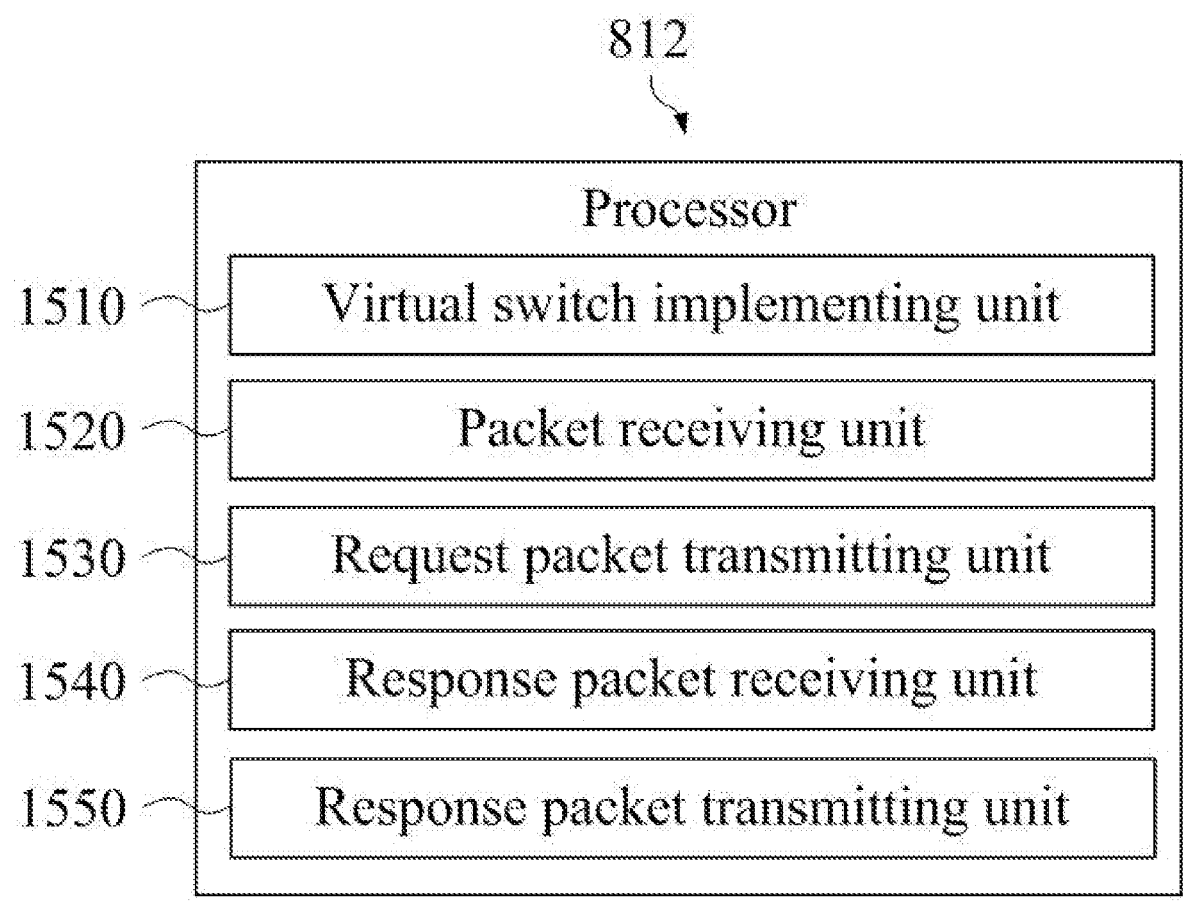
FIG. 15 is a block diagram of processor components of a physical node for implementing a TOR switch node in a virtual network environment according to some exemplary embodiments.
Figure 16:
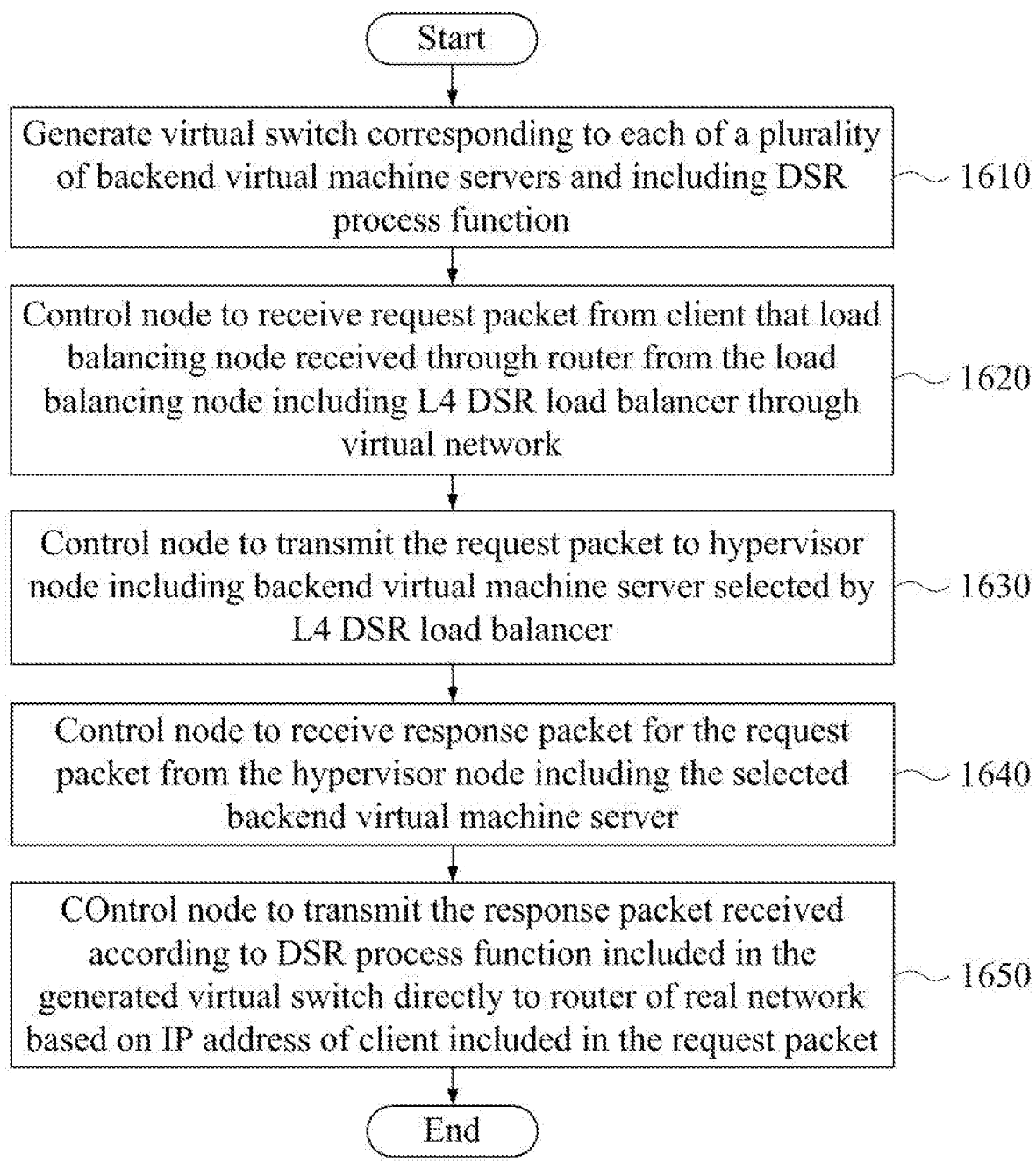
FIG. 16 is a flowchart of a method of a TOR switch node according to some exemplary embodiments.

FIG. 15 is a block diagram of processor components of a physical node for implementing a ToR switch node in a virtual network environment according to some exemplary embodiments. FIG. 16 is a flowchart of a method of a ToR switch node according to some exemplary embodiments.

According to some exemplary embodiments, the node 810 may be a physical device corresponding to the above described ToR switch. The processor 812 included in the node 810 may include a virtual switch implementing unit 1510, a packet receiving unit 1520, a request packet transmitting unit 1530, a response packet receiving unit 1540, and a response packet transmitting unit 1550.

The processor 812 and the various components of the processor 812 may perform operations 1610 to 1650 in the method of FIG. 16. The processor 812 and the various components of the processor 812 may be implemented to execute instructions according to an operating system code and/or at least one program code included in, for instance, the memory 811. The various components of the processor 812 may be expressions of different functions of the processor 812 performed by the processor 812 according to control instructions provided by a program code stored in the node 810. Here, the processor 812 may read the control instructions from the memory 811 including instructions relating to the control of the node 810, and may control the node 810 to perform operations 1610 to 1660 described hereinafter according to the read control instructions.

In operation 1610, the virtual switch implementing unit 1510 may correspond to each of a plurality of backend VM servers and generate a virtual switch including a DSR function. The plurality of backend VM servers may be configured to at least one hypervisor node. The virtual switch implementing unit 1510 may confirm the plurality of backend VM servers configured to the at least one hypervisor node described above, and generate the virtual switch for each of the confirmed backend VM servers.

In operation 1620, the packet receiving unit 1520 may control the node 810 to receive the request packet from the client that the load balancing node received through the router from a load balancing node including a L4 DSR load balancer. As described above, the request packet may be transmitted by overlaying information for transmitting the request packet through a virtual network to the request packet according to tunneling by applying a networking protocol among VxLAN, VLAN, GRE, and 802.11br. Here, the information overlaid to the request packet may include header information for layer 2 and layer 3 of the network model and header information for the virtual networking protocol.

In operation 1630, the request packet transmitting unit 1530 may control the node 810 to transmit the request packet to the hypervisor node including the backend VM server selected by the L4 DSR load balancer. For example, the request packet transmitting unit 1520 may transmit the request packet to the hypervisor node by extracting the request packet from the request packet that the information is overlaid through the generated virtual switch and transmitting the extracted request packet to the selected backend VM server.

In operation 1640, the response packet receiving unit 1540 may control the node 810 to receive a response packet for the request packet from the hypervisor node including the selected backend VM server. Here, the request packet may be processed by the selected VM server, and the response packet may be generated through the selected backend VM server.

In operation 1650, the response packet transmitting unit 1550 may control the node 810 to transmit the received response packet according to the DSR processing function that the generated virtual switch includes to the router of real network based to the address (e.g., IP address) of the client that the request packet includes. For example, the response packet transmitting unit 1550 may transmit the generated response packet directly to the router of the real network through the DSR processing function without going through the L4 DSR load balancer via virtual network. In other words, the request packet is transmitted from the load balancing node through virtual network, but the response packet for the request packet may be transmitted directly to the router through the real network, thereby bypassing the load balancing node.

Figure 17:
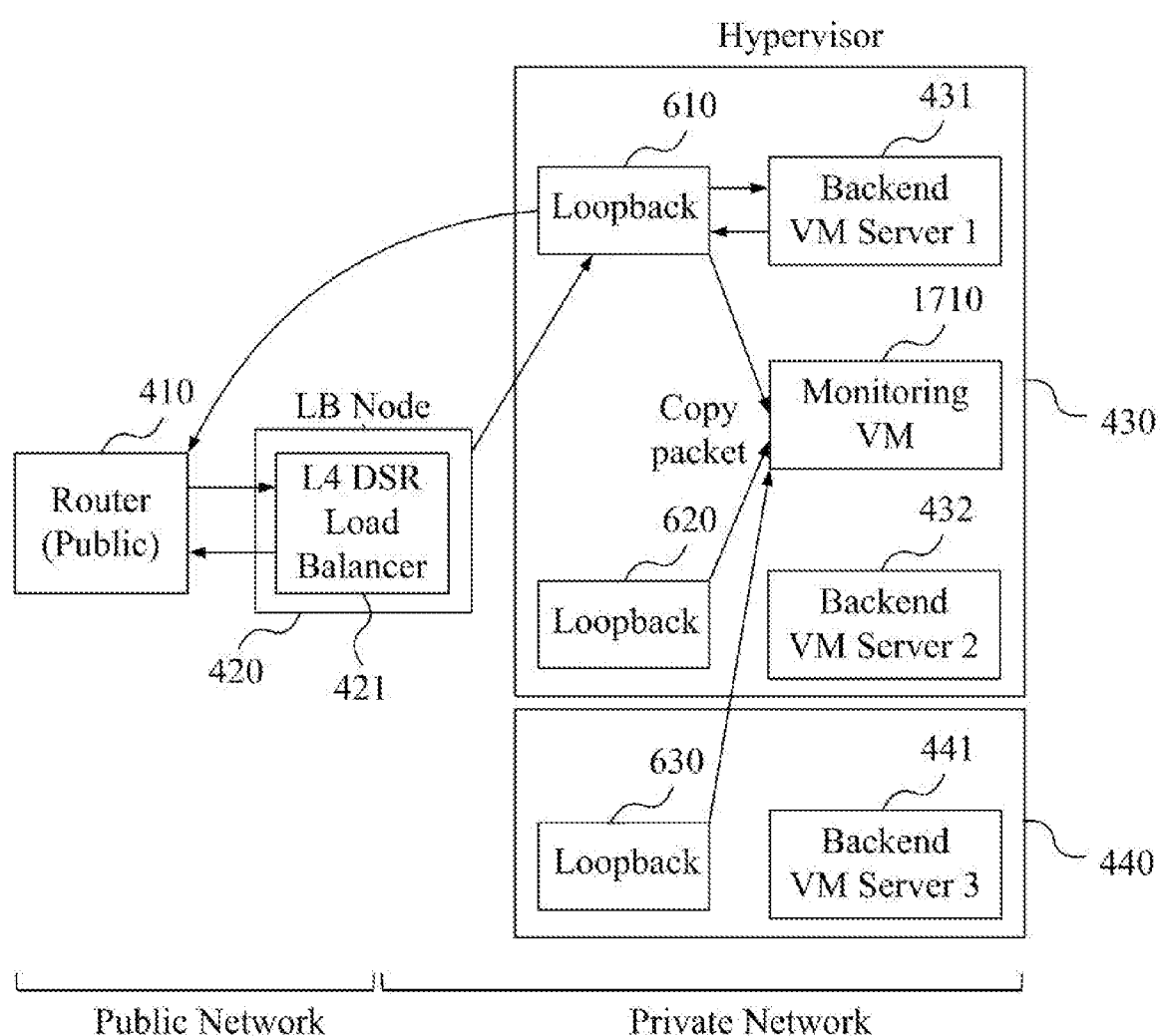
FIG. 17 illustrates an operation for packet monitoring using loopback in a virtual network environment according to some exemplary embodiments.

FIG. 17 illustrates an operation for packet monitoring using loopback in a virtual network environment according to some exemplary embodiments. As seen in FIG. 17, the virtual network environment includes the router 410, the load balancing node 420, the hypervisors 430, 440, the L4 DSR load balancer 421, the first backend VM server 431, the second backend VM server 432, the third backend VM server 441, and loopback modules 610, 620, 630 for each of the backend VM servers 431, 432, 441 described through FIG. 6. Also, the virtual network environment of FIG. 17 further includes a monitoring VM 1710.

According to some exemplary embodiments, the loopback modules 610, 620, 630 process all of the (or selected) packets transmitted and received for each of the backend VM servers 431, 432, 441 as described above. In various exemplary embodiments, the loopback modules 610, 620, 630 may copy all of the packets transmitted and received, and transmit the copied packets to the monitoring VM 1710. It is noted that, in some exemplary embodiments, only packets transmitted and received for a particular backend VM server may be copied and transmitted to the monitoring VM 1710.

In this case, the monitoring VM 1710 may include a function for deep packet inspection (DPI). The DPI is a technology for inspecting not only departure point and destination for a packet, but also contents of the packet. In this manner, DPI is a technology for analyzing particular data by identifying and classifying the packet based on the data of the application level (e.g., layer 7), and may identify and analyze whether there is attack of a worm, hacking, and/or the like, through the identification and classification. In other words, in some exemplary embodiments, the monitoring VM 1710 may analyze the packets using a function for DPI by mirroring all (or select) packets transmitted and received for a backend VM server by using the virtual switch used for L4 DSR load balancing to the monitoring VM 1710. As seen in FIG. 17, an example that the monitoring VM 1710 is included in the hypervisor 430 is shown, but the monitoring VM 1710 may be implemented to any location where it may receive packets from the virtual switch corresponding to the desired backend VM server. For example, the monitoring VM 1710 may be implemented in an extra hypervisor node.

Figure 18:
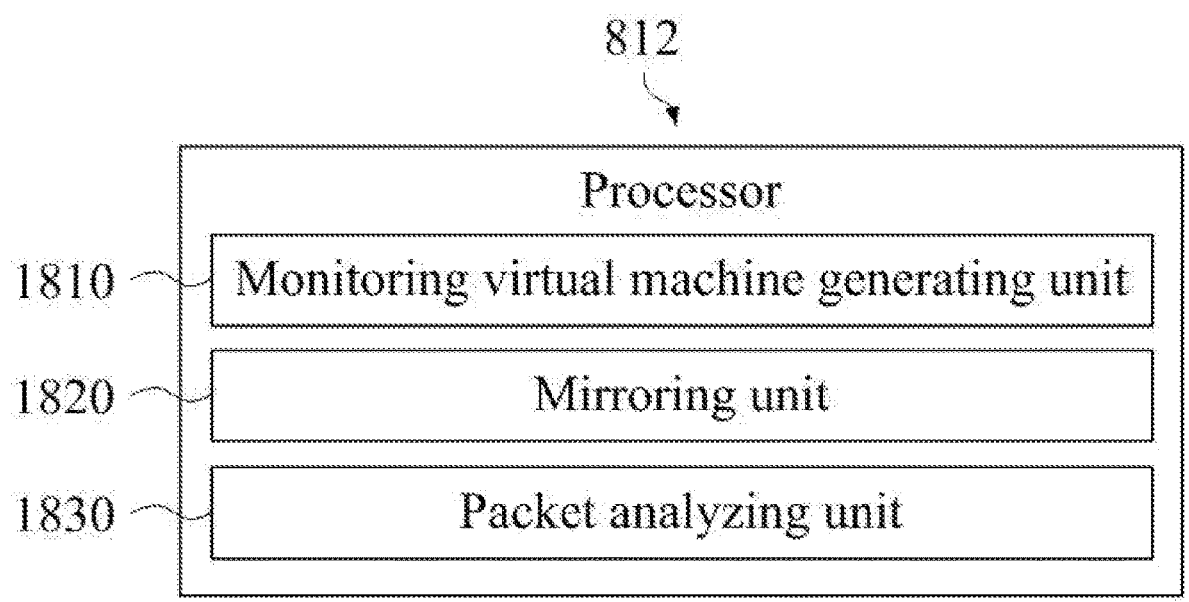
FIG. 18 is a block diagram of processor components of a physical node implementing a monitoring virtual machine in a virtual network environment according to some exemplary embodiments.
Figure 19:
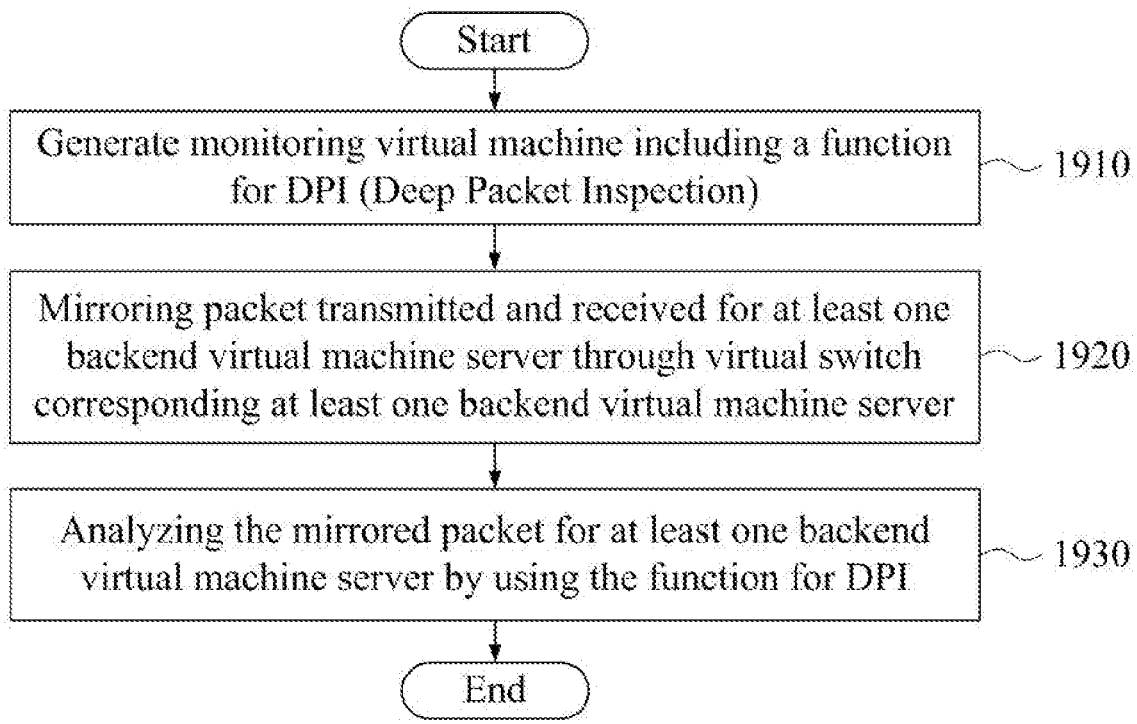
FIG. 19 is a flowchart of a method of a node implementing a monitoring virtual machine according to some exemplary embodiments.

FIG. 18 is a block diagram of processor components of a physical node implementing a monitoring virtual machine in a virtual network environment according to some exemplary embodiments. FIG. 19 is a flowchart of a method of a node implementing a monitoring virtual machine according to some exemplary embodiments.

According to some exemplary embodiments, the node 810 may be a physical device corresponding to the node for implementing the monitoring VM as described above. The processor 812 included in the node 810 may include a monitoring VM generating unit 1810, a mirroring unit 1820, and a packet analyzing unit 1830.

The processor 812 and the various components of the processor 812 may perform operations 1910 to 1930 in the method of FIG. 19. The processor 812 and the various components of the processor 812 may be implemented to execute instructions according to an operating system code and/or at least one program code included, for instance, in the memory 811. The various components of the processor 812 may expressions of different functions of the processor 812 performed by the processor 812 according to control instructions provided by a program code stored in the node 810. Here, the processor 812 may read the control instructions from the memory 811 including instructions relating to control of the node 810, and may control the node 810 to perform operations 1910 to 1930 described hereinafter according to the read control instructions.

In operation 1910, the monitoring VM generating unit 1810 may generate a monitoring VM including a function for DPI. It is noted that DPI is well known as a technology for inspecting contents of a packet, as well as a departure point and a destination of the packet.

In operation 1920, the mirroring unit 1820 may mirror packets transmitted and received for at least one backend VM server through a virtual switch corresponding to the at least one backend VM server. The virtual switch may separate real packets from virtual packets transmitted through the virtual network from the load balancing node for load balancing and transmit the separated real packets to the corresponding backend VM server, and transmit a response packet for the real packets from the backend VM server to the router of real network. That is, the virtual switch may transmit the response packet directly to the router of the real network according to the loopback interface set in the virtual switch without going through the L4 DSR load balancer that the load balancing node includes via the virtual network.

In operation 1930, the packet analyzing unit 1830 may analyze the mirrored packet for the at least one backend VM server using the function for DPI. In this manner, exemplary embodiments easily enable reception of the packets transmitted and received to the backend VM server in the virtual network environment.

As described above, the backend VM server, which is configured by a customer, is typically hard to request and/or force to add a mirroring function for packets. Also, in the DSR method, the load balancing node typically only handles the packet to be transmitted to the backend VM server, and because the router is an device on a real network (e.g., public network), a service provider for the virtual network may not change the function arbitrarily. In some exemplary embodiments, however, the packets transmitted and received for the desired backend VM server in the virtual network environment may be easily acquired by mirroring the packets transmitted and received for the backend VM server to the monitoring VM by using the virtual switch, which may be managed by the service provider.

According to some exemplary embodiments, the processor 812 and the various components of the processor 812 may perform operations 1610 to 1650 in the method of FIG.

16. Here, the processor 812 and the various components of the processor 812 may be implemented to execute instructions according to an operating system code and/or at least one program code included, for instance, in the memory 811. The various components of the processor 812 may be expressions of different functions of the processor 812 performed by the processor 812 according to control instructions provided by a program code stored in the node 810. Here, the processor 812 may read the control instructions from the memory 811 including instructions relating to control of the node 810, and may control the node 810 to perform operations 1610 to 1660 according to the read control instructions. It may be easily understood by those skilled in the art that analyzing the acquired packets using DPI may be processed through existing well-known technologies.

Because overlay, tunneling, and the like for transmitting packets through virtual networks or the virtual switch that a loopback interface is set, the virtual switch using a ToR switch for L4 DSR load balancing have been described in detail, and, as such, repeated description will be omitted.

Likewise, according to various exemplary embodiments, load balancing for a backend VM server configured by customers through a hypervisor in a VPC environment may be processed using tunneling. Also, in a VPC environment, response of the backend VM server may be transmitted directly to the router without a need for setting a loopback interface by customers and going through the load balancer by implementing and providing the loopback interface utilized by the backend VM server through a virtual switch of hypervisor machine server. Latency may be reduced by processing L4 DSR load balancing in a VPC environment by using the described load balancer and virtual switch architectures described herein. Also, all (or subsets of) packets transmitted and received for the desired backend VM may be collected and analyzed in a monitoring VM by mirroring the packets transmitted and received in the backend VM server to a monitoring VM including the function for DPI using the virtual switch for load balancing.

In some exemplary embodiments, the units described herein may be implemented using hardware components, software components, firmware components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor, and/or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used in the singular; however, one of ordinary skill in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over a network coupled computer systems so that the software is stored and executed in a distributed fashion. In particular, the software and data may be stored by one or more computer readable recording mediums.

Exemplary embodiments may be recorded in non-transitory computer-readable media including program instructions to implement various operations embodied by a computer. The media may also include, alone or in combination with the program instructions, data files, data structures, and/or the like. The media and program instructions may be those specially designed and constructed for the purposes described herein, or they may be of the kind well-known and available to those having ordinary skill in the computer software arts. Examples of non-transitory computer-readable media include magnetic media, such as hard disks, floppy disks, and magnetic tape; optical media, such as CD ROM disks and DVD; magneto-optical media, such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A method to load balance via a load balancing node in a virtual network environment, the method comprising:
   receiving a request packet from a client through a router and a public network;
   selecting, via a load balancer of the load balancing node, a backend virtual machine server to receive the received request packet;
   generating, via a virtual switch of the load balancing node, a packet for virtual networking by overlaying information for transmitting the received request packet to the selected backend virtual machine server through a virtual network as a private network to the received request packet;
   transmitting the generated packet for virtual networking to a hypervisor node comprising the selected backend virtual machine server; and collecting and analyzing, by a monitoring virtual machine included in hypervisor, the generated packet, the monitoring virtual machine performing deep packet inspection (DPI) of the generated packet, wherein:
the load balancer comprises a layer 4 (L4) direct server return (DSR) load balancer,
wherein the collecting and analyzing comprises:
mirroring, by a mirroring unit implemented in the monitoring virtual machine, the generated packet through a virtual switch included in the hypervisor node; and
analyzing, by a analyzing unit implemented in the monitoring virtual machine, the mirrored packet by performing DPI for the mirrored packet, and
wherein the virtual switch of the hypervisor node is configured to separate the request packet from the generated packet and to transmit the separated request packet to the selected backend virtual machine server, and further configured to directly transmit a response packet from the selected backend virtual machine server to the router without passing through the load balancing node.

2. The method of claim 1, wherein the hypervisor node is configured to:
receive the transmitted packet for virtual networking through the virtual network;
extract the request packet via a virtual switch for the selected backend virtual machine server among virtual switches of the hypervisor node; and
transmit the extracted request packet to the selected backend virtual machine server.

3. The method of claim 1, wherein:
the transmitted packet for virtual networking is transmitted to a top of rack (ToR) switch, reconverted to the request packet through a virtual switch for the selected backend virtual machine server among virtual switches of the ToR switch, and transmitted to the hypervisor node; and
the hypervisor node is configured to transmit the reconverted request packet to the selected backend virtual machine server.

4. The method of claim 1, wherein:
the request packet comprises a networking address of the client; and
the networking address of the client is transmitted to the selected backend virtual machine server through the packet for virtual networking.

5. The method of claim 1, wherein generating the packet for virtual networking comprises generating the packet for virtual networking for tunneling via application of a virtual networking protocol, the virtual networking protocol being one of virtual extensible local area network (VxLAN), virtual LAN (VLAN), generic route encapsulation (GRE), and 802.11 br.

6. The method of claim 1, wherein the information overlaid to the request packet comprises header information for layer 2 and layer 3 of a network model and header information for a virtual networking protocol.

7. A method to load balance via a hypervisor node in a virtual network environment, the method comprising:
receiving, via a virtual network from a load balancing node comprising a load balancer, a packet for virtual networking, the packet for virtual networking having been generated, via a virtual switch of the load balancing node, by overlaying information to a request packet received from a client through a router and a public network by the load balancing node, the information enabling transmission of the request packet through the virtual network as a private network;
extracting the request packet from the packet for virtual networking through a virtual switch for a backend virtual machine server selected by the load balancer among virtual switches of the hypervisor node;
collecting and analyzing, by a monitoring virtual machine included in the hypervisor, the extracted request packet, the monitoring virtual machine performing deep packet inspection (DPI) of the extracted request packet; and
transmitting the extracted request packet to the selected backend virtual machine server,
wherein:
the load balancer comprises a layer 4 (L4) direct server return (DSR) load balancer,
wherein the collecting and analyzing comprises:
mirroring, by a mirroring unit implemented in the monitoring virtual machine, the generated packet through a virtual switch included in the hypervisor node; and
analyzing, by a analyzing unit implemented in the monitoring virtual machine, the mirrored packet by performing DPI for the mirrored packet, and
wherein the virtual switch of the hypervisor node is configured to separate the request packet from the generated packet and to transmit the separated request packet to the selected backend virtual machine server, and further configured to directly transmit a response packet from the selected backend virtual machine server to the router without passing through the load balancing node.

8. A non-transitory computer-readable media comprising a computer program to implement a method for processing load balancing in conjunction with a load balancing node implemented via a computer, the method comprising:
receiving a request packet from a client through a router and a public network;
selecting, via a load balancer of the load balancing node, a backend virtual machine server to receive the received request packet;
generating, via a virtual switch of the load balancing node, a packet for virtual networking by overlaying information for transmitting the received request packet to the selected backend virtual machine server through a virtual network as a private network to the received request packet;
transmitting the generated packet for virtual networking to a hypervisor node comprising the selected backend virtual machine server; and
collecting and analyzing, by a monitoring virtual machine included in the hypervisor, the generated packet, the monitoring virtual machine performing deep packet inspection (DPI) of the generated packet,
wherein:
the load balancer comprises a layer 4 (L4) direct server return (DSR) load balancer,
wherein the collecting and analyzing comprises:
mirroring, by a mirroring unit implemented in the monitoring virtual machine, the generated packet through a virtual switch included in the hypervisor node; and
analyzing, by a analyzing unit implemented in the monitoring virtual machine, the mirrored packet by performing DPI for the mirrored packet, and
wherein the virtual switch of the hypervisor node is configured to separate the request packet from the generated packet and to transmit the separated request packet to the selected backend virtual machine server, and further configured to directly transmit a response packet from the selected backend virtual machine server to the router without passing through the load balancing node.

9. The non-transitory computer-readable media of claim 8, wherein the hypervisor node is configured to:
receive the transmitted packet for virtual networking through the virtual network;
extract the request packet via a virtual switch for the selected backend virtual machine server among virtual switches of the hypervisor node; and
transmit the extracted request packet to the selected backend virtual machine server.

10. The non-transitory computer-readable media of claim 8, wherein:
the transmitted packet for virtual networking is transmitted to a top of rack (ToR) switch, reconverted to the request packet through a virtual switch for the selected backend virtual machine server among virtual switches of the ToR switch, and transmitted to the hypervisor node; and
the hypervisor node is configured to transmit the reconverted request packet to the selected backend virtual machine server.

11. The non-transitory computer-readable media of claim 8, wherein:
the request packet comprises a networking address of the client; and
the networking address of the client is transmitted to the selected backend virtual machine server through the packet for virtual networking.

12. A load balancing node implemented via a computer, the load balancing node comprising:
at least one processor; and
at least one memory comprising one or more sequences of one or more instructions configured to, in response to being executed by the at least one processor, cause the load balancing node at least to:
receive a request packet from a client through a router and a public network;
select, via a load balancer of the load balancing node, a backend virtual machine server to receive the received request packet;
generate, via a virtual switch of the load balancing node, a packet for virtual networking via overlay of information for transmission of the received request packet to the selected backend virtual machine server through a virtual network as a private network to the received request packet; and
transmit the generated packet for virtual networking to a hypervisor node comprising the selected backend virtual machine server; and
collect and analyze, by a monitoring virtual machine included in the hypervisor, the generated packet, the monitoring virtual machine performing deep packet inspection (DPI) of the generated packet,
wherein:
the load balancer comprises a layer 4 (L4) direct server return (DSR) load balancer,
wherein the collect and analyze comprises:
mirroring, by a mirroring unit implemented in the monitoring virtual machine, the generated packet through a virtual switch included in the hypervisor node; and
analyzing, by a analyzing unit implemented in the monitoring virtual machine, the mirrored packet by performing DPI for the mirrored packet, and
wherein the virtual switch of the hypervisor node is configured to separate the request packet from the generated packet and to transmit the separated request packet to the selected backend virtual machine server, and further configured to directly transmit a response packet from the selected backend virtual machine server to the router without passing through the load balancing node.

13. The load balancing node of claim 12, wherein the hypervisor node is configured to:
receive the transmitted packet for virtual networking through the virtual network;
extract the request packet via a virtual switch for the selected backend virtual machine server among virtual switches of the hypervisor node; and
transmit the extracted request packet to the selected backend virtual machine server.

14. The load balancing node of claim 12, wherein:
the transmitted packet for virtual networking is transmitted to a top of rack (ToR) switch, reconverted to the request packet through a virtual switch for the selected backend virtual machine server among virtual switches of the ToR switch, and transmitted to the hypervisor node; and
the hypervisor node is configured to transmit the reconverted request packet to the selected backend virtual machine server.

15. The load balancing node of claim 12, wherein:
the request packet comprises a networking address of the client; and
the networking address of the client is transmitted to the selected backend virtual machine server through the packet for virtual networking.

16. The method of claim 1, further comprising:
separating, by the mirroring unit, real packets from virtual packets transmitted to and received for the selected virtual machine server.

17. The method of claim 7, further comprising:
separating, by the mirroring unit, real packets from virtual packets transmitted to and received for the selected virtual machine server.

18. The non-transitory computer-readable media of claim 8, the method for processing load balancing in conjunction with a load balancing node implemented via a computer further comprising:
separating, by the mirroring unit, real packets from virtual packets transmitted to and received for the selected virtual machine server.

19. The load balancing node of claim 12, the one or more sequences of one or more instructions further configured to, in response to being executed by the at least one processor, cause the load balancing node at least to:
separate, by the mirroring unit, real packets from virtual packets transmitted to and received for the selected virtual machine server.

* * * * *